(12) United States Patent
Ichikawa et al.

(10) Patent No.: US 9,327,548 B2
(45) Date of Patent: May 3, 2016

(54) WHEEL FOR MOTORCYCLE

(75) Inventors: Kazuhiro Ichikawa, Kobe (JP); Masato Kogirima, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 661 days.

(21) Appl. No.: 13/611,354

(22) Filed: Sep. 12, 2012

(65) Prior Publication Data
US 2013/0076109 A1   Mar. 28, 2013

(30) Foreign Application Priority Data

Sep. 22, 2011   (JP) ................................ P2011-207377
Sep. 22, 2011   (JP) ................................ P2011-207380

(51) Int. Cl.
 *B60B 1/06*   (2006.01)
 *B60B 1/08*   (2006.01)

(52) U.S. Cl.
 CPC .............. *B60B 1/08* (2013.01); *B60B 2310/202* (2013.01); *B60B 2310/226* (2013.01); *B60B 2900/111* (2013.01); *B60B 2900/311* (2013.01); *B60Y 2200/12* (2013.01)

(58) Field of Classification Search
 CPC ...... B60B 1/06; B60B 1/08; B60B 2900/111; B60B 2900/311
 USPC ........ 301/62, 64.101, 63.101, 64.102, 65, 66; D12/204, 209, 211
 See application file for complete search history.

(56) References Cited

U.S. PATENT DOCUMENTS

| | | | | |
|---|---|---|---|---|
| 4,118,073 | A * | 10/1978 | Marwitz | ........................ 301/6.3 |
| 4,280,736 | A * | 7/1981 | Raudman | ........................ 301/6.3 |
| 7,690,668 | B2 * | 4/2010 | Holroyd | ................. B62K 25/02 280/277 |
| D700,566 | S * | 3/2014 | Ichikawa et al. | ............. D12/209 |
| 2003/0011238 | A1 * | 1/2003 | Buell | ........................ B60B 1/06 301/74 |
| 2010/0096908 | A1 * | 4/2010 | Nagao | ....................... B60B 1/14 301/58 |

FOREIGN PATENT DOCUMENTS

| | | | |
|---|---|---|---|
| EP | 1 886 839 | 2/2008 | |
| JP | 55-62401 | 4/1980 | |
| JP | 60-110103 | 7/1985 | |
| JP | 04-1001 | 1/1992 | |
| JP | 6-227202 | 8/1994 | |
| JP | 06227202 A * | 8/1994 | ............... B60B 1/06 |
| JP | 9-250577 | 9/1997 | |
| JP | 2003-252001 | 9/2003 | |
| JP | 2008-30648 | 2/2008 | |
| JP | 2009-184435 | 8/2009 | |

* cited by examiner

*Primary Examiner* — S. Joseph Morano
*Assistant Examiner* — Jean Charleston
(74) *Attorney, Agent, or Firm* — Wenderoth, Lind & Ponack, L.L.P.

(57) ABSTRACT

A wheel for a motorcycle integrally includes a hub, a rim, and a plurality of spokes. The plurality of spokes includes a main spoke and a sub spoke extending from the hub to the main spoke. The main spoke is inclined toward a first wheel circumferential direction with respect to a straight line connecting a first coupling portion between the main spoke and the hub to a wheel rotational center, and the sub spoke is inclined toward a second wheel circumferential direction with respect to a straight line connecting a second coupling portion between the sub spoke and the hub and the wheel rotational center.

20 Claims, 18 Drawing Sheets

US 9,327,548 B2

WHEEL FOR MOTORCYCLE

BACKGROUND OF THE INVENTION

1. Field of the Invention

An integrated wheel for a motorcycle is well known. Such an integrated wheel is formed of a hub, a rim and spokes in an integral manner. In the integrated wheel, to improve the rigidity in a rotating direction while suppressing an increase in weight, each of the spokes is inclined toward a wheel circumferential direction from the hub outwardly in a wheel radial direction.

2. Description of the Related Art

FIG. 22 shows a conventional motorcycle having a wheel configuration as disclosed in JP-A-2009-184435, both of a front wheel 200 and a rear wheel 201 have an integrated wheel configuration, and both of spokes 200a and 201a are inclined in the wheel circumferential direction. Specifically, the spokes 200a of the front wheel 200 are inclined toward a rotating direction R1 from a front hub 200b outwardly in the wheel radial direction, whereas the spokes 201a of the rear wheel 201 are inclined toward an inverse rotating direction R2 from a rear hub 201b outwardly in the wheel radial direction.

FIG. 23 is an enlarged view of the rear wheel 201 in FIG. 22, and as described above, all of the rear spokes 201a are inclined toward the inverse rotating direction R2 with respect to a straight line M1 connecting a wheel rotational center O1 and a coupling portion 201d between each of the spokes 201a and the hub 201b.

A load is applied to the front and rear wheels 200 and 201 in FIG. 22 during driving so as to displace the rim relative to the hub around the wheel rotational center. By inclining the spokes 200a and 201a, above the load, a bending load is generated, that is, a load in a direction orthogonal to the wheel radial direction or a load in a direction orthogonal to a spoke longitudinal direction, as well as a compressive load in the spoke longitudinal direction or a pulling load, to the spokes 200a and 201a. Thus, as compared to the case where all loads are received by the rigidity of each spoke in the bending direction, the loads can be received by the rigidity in the compression and pulling direction, thereby preventing deformation of the spokes and improving the rigidity in the wheel rotating direction.

In a motorcycle, to properly inform the rider of the grip state of the tire, it is desired to improve the rigidity of the wheels. As a means of improving the rigidity of the wheels, it has been proposed to increase the number of spokes, or increase the size in the wheel circumferential direction or the thickness in the axial direction of the spokes. In this case, an increase in the number of the spokes or the size of the spokes leads to an increase in the weight of the wheels and in a moment of inertia in the wheel rotating direction.

However, in a motorcycle, unlike a four-wheeled vehicle, the vehicle body needs to be inclined for circling (cornering). When the moment of inertia of the wheels increases as described above, it is difficult to incline the vehicle body, making improvement of the circling performance of the vehicle body difficult.

In a motorcycle for racing, rapid acceleration through an operation of an accelerator and rapid deceleration through an operation of a brake are often performed, and as a result, a ratio of the load applied from the road surface to the front wheel and the rear wheel frequently varies. At acceleration, the ratio of the load applied from the road surface to the rear wheel, that is, a driving load to the rear wheel becomes large. Conversely, at deceleration through the operation of the brake, the ratio of the load applied from the road surface to the front wheel, that is, a braking load to the front wheel becomes large. Moreover, the driving load applied from the road surface to the rear wheel at acceleration is applied as a large load to the rear wheel 201 in FIG. 22 toward the inverse rotating direction R2 (FIG. 22), whereas the braking load applied from the road surface to the front wheel at braking is applied as a large load toward the rotating direction R1.

However, as shown in FIG. 22, when the spokes 201a of the rear wheel 201 on the driving side are inclined toward the inverse rotating direction R2 from the hub outwardly in the wheel radial direction, improvement of the rigidity in the rotating direction due to inclination of the spokes 201a cannot be expected so much at acceleration, in particular, rapid acceleration. That is, the ratio of the bending load applied to the spokes becomes large, disturbing improvement of the rigidity.

An object of the present invention is to provide a wheel for a motorcycle capable of improving the rigidity of the wheels about the rotational center while suppressing the increase in the weight of the wheels and maintaining the circling performance of the vehicle body.

Further, another object is to improve the rigidity for the driving load while reducing the weight of the rear wheel by receiving the driving load applied to the rear wheel as a driving wheel as a compressive load in the longitudinal direction of the rear spokes.

SUMMARY OF THE INVENTION

To attain the above-mentioned objects, this application provides the following first and second aspects of the present invention.

The first aspect of the present invention includes a hub supported by an axle; a rim holding a tire; and a plurality of spokes connecting the hub to the rim, the hub, the rim and the spokes being integrally provided, wherein the spokes include a main spoke extending from the hub to the rim and a sub spoke extending from the hub to the main spoke, the main spoke extending outwardly from the hub in a wheel radial direction is inclined toward one wheel circumferential direction with respect to a straight line connecting a coupling portion between the main spoke and the hub to a wheel rotational center, and the sub spoke extending outwardly from the hub in the wheel radial direction is inclined toward the other wheel circumferential direction with respect to a straight line connecting a coupling portion between the sub spoke and the hub to the wheel rotational center.

In the first aspect of the present invention, preferably, the following configurations are provided.

(a) A given first main spoke of the plurality of main spokes and a second sub spoke coupled to a second main spoke other than the first main spoke are arranged such that a load applied from a road surface to the first main spoke is transmitted to the second sub spoke.

(b) In the wheel for the motorcycle according to the above-mentioned paragraph (a), the second sub spoke is arranged along a longitudinal direction of the first main spoke substantially on an extension from the rim toward the hub.

(c) In the wheel for the motorcycle according to the above-mentioned paragraph (b), a coupling portion exists between the second sub spoke and the hub on an extension of a line segment from the rim to the hub along the longitudinal direction of the first main spoke, and the second sub spoke extends along the extension outwardly in the wheel radial direction.

(d) In the wheel for the motorcycle according to the above-mentioned paragraph (c), a coupling portion between the first main spoke and the hub is connected with the coupling portion between the second sub spoke and the hub via an outer circumference of the hub.

(e) In the wheel for the motorcycle according to the above-mentioned paragraph (b), the hub includes a cylindrical hub body and a protruding portion protruding outwardly from the hub body in the wheel radial direction, the protruding portion extending in the wheel circumferential direction, and the protruding portion extending from the coupling portion between the first main spoke and the hub to the coupling portion between the second sub spoke and the hub in the circumferential direction.

(f) In the wheel for the motorcycle according to the above-mentioned paragraph (b), the first main spoke is curved so as to expand toward the other wheel circumferential direction, and the first main spoke is curved so as to be smoothly connected to an arcuate outer circumference of the hub, the outer circumference extending from the coupling portion between the second sub spoke and the hub to the coupling portion between the first main spoke and the hub.

(g) In the wheel for the motorcycle according to the above-mentioned paragraph (a), another third main spoke is arranged between the first main spoke and the second main spoke in the wheel circumferential direction.

(h) In the wheel for the motorcycle according to the above-mentioned paragraph (g), the coupling portion between the second sub spoke and the hub is set so as to overlap a coupling portion between the third main spoke and the hub in the wheel circumferential direction.

(i) In the wheel for the motorcycle according to the above-mentioned paragraph (a), a coupling portion between the second main spoke and the hub is separated from the coupling portion between the first main spoke and the hub by 90 degrees or more in the wheel circumferential direction.

(j) In the first aspect of the present invention, the main spoke is tapered such that a size in the wheel circumferential direction becomes smaller toward the outer side in the wheel radial direction.

(k) In the first aspect of the present invention, a recess recessed inwardly in the wheel radial direction is formed at a central portion of the rim in an axle direction over an entire circumference of the rim, the recess having a substantially rectangular cross section.

With the first aspect of the present invention, since the main spokes extending from the hub to the rim are inclined toward one wheel circumferential direction outwardly in the wheel radial direction, as compared to the case where all of load is received by the rigidity in the bending direction, the load is also received by the rigidity in the compressive or pulling direction of the main spokes, thereby suppressing deformation of the main spokes and improving the rigidity in the wheel rotating direction. Moreover, the following effects can be achieved.

Since, in addition to the main spokes, the sub spokes that extend from the hub to the respective main spokes and are inclined in a direction opposite to the inclined direction of the main spokes are integrally provided, deformation of each of the main spokes can be suppressed by the sub spokes, the number of main spokes is reduced to decrease weight, and the rigidity in the wheel rotating direction can be improved.

Specifically, by forming the sub spokes supporting the main spokes, the rigidity of the main spokes on the side of the hub (inner side in the wheel radial direction) can be increased. Therefore, an advantageous effect of improving the rigidity of the wheels can be obtained, irrespective of the increase in the moment of inertia of the wheel around the rotational center, which is caused by the arrangement of the sub spokes.

Further, since the sub spokes support the respective main spokes from the inclined direction of the main spokes, when the main spokes are subjected to the bending load, the sub spokes can receive the bending load of the main spokes as the compressive or pulling load, and therefore, bending deformation of the main spokes can be efficiently suppressed. In this manner, the rigidity of the wheels around the rotational center can be improved while suppressing the increase in the weight and the moment of inertia of the wheels.

When the rigidity of the wheels is improved as described above, the grip state or the slip state of the tire during driving is properly transmitted to the rider, that is, feedback to the rider is properly performed, and the rider can properly recognize the state of the road surface and the driving state. By suppressing the moment of inertia of the wheels, the circling or cornering performance of the vehicle body can be maintained.

With configuration (a), the load transmitted from the road surface to the first main spoke can be distributed to the second main spoke and the rim via the second sub spoke without concentrating the load on the rotational center of the hub, thereby suppressing deformation of the first main spoke.

With configuration (b), since the load transmitted from the road surface to the first main spoke is transmitted along the longitudinal direction of the first main spoke and is received by the second sub spoke, the load received by the first main spoke is distributed to the rim to which the second main spoke and the second main spoke are connected via the second sub spoke, thereby suppressing deformation of the first main spoke.

As in configuration (c), when the coupling portion between the second sub spoke and the hub is located on the extension of the first main spoke in the longitudinal direction, and the second sub spoke is extended along the extension outwardly in the wheel radial direction, the load applied from the road surface to the first main spoke is easily distributed to the second sub spoke, further suppressing deformation of the first main spoke.

With configuration (d), since the coupling portion on the inner side of the first main spoke is coupled to the coupling portion on the inner side of the second sub spoke via the outer circumference of the hub, the second sub spoke can be shortened, thereby achieving reduction of the weight of the wheels and suppressing deformation of the first main spoke.

With configuration (e), the rigidity of the hub is improved by forming the protruding portion on the outer circumference of the hub body, and the efficiency of transmitting the load from the first main spoke to the second sub spoke is further improved by preventing deformation of the hub.

With configuration (f), by curving the first main spoke so as to expand in a direction opposite to the inclined direction, the load transmitted to the first main spoke can be easily distributed to the second sub spoke, thereby further suppressing deformation of the first main spoke.

With configuration (g), the coupling portion between the sub spoke and the main spoke can be separated from the outer circumferential surface of the hub outwardly in the wheel radial direction by a certain distance, thereby improving the rigidity of the wheels around the rotational center.

As in configuration (h), by allowing the coupling portion between the second sub spoke and the hub and the coupling portion between the third main spoke and the hub to overlap in the wheel circumferential direction, the rigidity of the coupling portion between the second sub spoke and the hub can be increased. Further, since the second sub spoke extends from the coupling portion between the third main spoke and the hub, the length of the second sub spoke can be decreased.

With configuration (i), the load received by the first main spoke can be transmitted to the hub on the opposite side of the axle and easily distributed to the second sub spoke, thereby further suppressing deformation of the first main spoke.

With configuration (j), the weight of the wheels can be reduced and the increase in the moment of inertia of the wheels can be suppressed while maintaining the rigidity around the rotational center.

With configuration (k), the rigidity of the rim is improved while suppressing the increase in the weight of the wheels.

In the second aspect of the present invention, a wheel for a motorcycle includes a rear wheel coupled to a driving source; and a front wheel driven by driving of a vehicle, and the rear wheel integrally includes a rear hub supported by a rear axle, a rear rim holding a rear tire, and a rear spoke connecting the rear hub to the rear rim, and the rear spoke extends outwardly from the hub in a wheel radial direction, is inclined toward a rotating direction and is curved toward an inverse rotating direction.

In the second aspect of the present invention, preferably, the following configurations are provided.

(a) The front wheel integrally includes a front hub supported by the front axle, a front rim holding a front tire, and a front spoke connecting the front hub to the front rim, and the front spoke extends outwardly from the hub in the wheel radial direction, is inclined toward the inverse rotating direction and is curved toward the rotating direction.

(b) The front wheel integrally includes a front hub supported by the front axle, a front rim holding a front tire, and a front spoke connecting the front hub to the front rim, and the front spoke extends outwardly in the wheel radial direction, is inclined toward the rotating direction and is curved toward the inverse rotating direction.

(c) The rear spoke includes a rear main spoke extending outwardly in a wheel radial direction from the rear hub to the rear rim, the rear main spoke being inclined toward the rotating direction and being curved toward the inverse rotating direction, and a rear sub spoke extending outwardly in the wheel radial direction.

With the second aspect of the present invention, the driving load applied to the rear wheel as the driving wheel can be received as the compressive load in the longitudinal direction of the rear spoke. This can reduce weight and improve the rigidity for the driving load.

With configuration (a), the braking load of the front wheel as a driven wheel can be received as the compressive load in the longitudinal direction of the front spoke. Thereby, the rigidity for the braking load can be improved while reducing weight.

With configuration (b), since the driving load of the front wheel as the driven wheel can be received as the compressive load in the longitudinal direction of the front spoke, and the rear main spokes that are inclined toward the rotating direction and curved toward the inverse rotating direction are combined with the rear sub spokes inclined toward the inverse rotating direction, the bending load applied to the rear main spokes can be supported by the sub spokes, thereby improving the rigidity of the rear wheel.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

First Embodiment

The first embodiment of the present invention will be described with reference to FIGS. 1-11.

[Overall Configuration of the Motorcycle]

Figure 1:
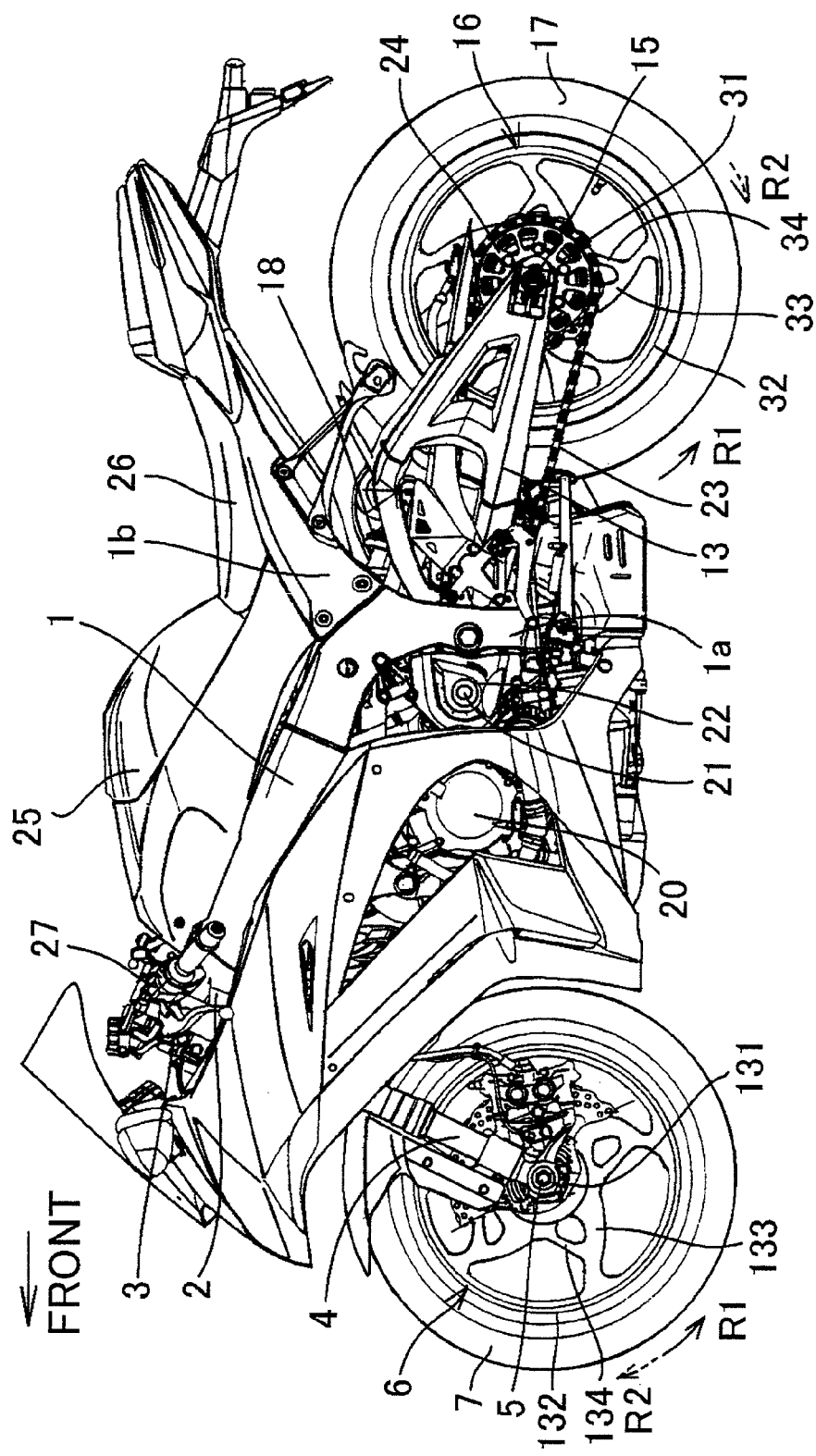
FIG. 1 is a left side view showing a motorcycle including wheels according to the present invention.

FIG. 1 is a left side view showing a motorcycle including wheels according to the present invention, and in particular, a motorcycle suitable for on-road driving and race driving, and an overall configuration of the motorcycle will be described with reference to FIG. 1.

A pair of right and left front forks 4 are supported by a head pipe 2 formed at a front end of a main frame 1 via a steering axis (not shown) and a pair of upper and lower brackets 3, a front wheel 6 is rotatably supported by a front axle 5 fixed to a lower end of the front fork 4, and a front tire 7 is attached to the front wheel 6.

A swing arm 13 extending rearwardly is vertically swingably supported by a swing arm bracket part 1a formed at a rear lower end of the main frame 1, a rear wheel 16 is rotatably supported by a rear axle 15 fixedly attached to a rear end of the swing arm 13, and a rear tire 17 is attached to the rear wheel 16. The swing arm 13 is resiliently-supported by the main frame 1 by means of a rear shock absorber 18.

An engine 20 is mounted below the main frame 1, and an output shaft 21 of the engine 20 is coupled to the rear wheel 16 via a drive sprocket 22, a drive chain 23 and a driven sprocket 24 to be capable of transmitting power. Driving force of the engine 20 rotates the rear wheel 16 and the rear tire 17 in a direction of an arrow R1.

A fuel tank 25, a sheet 26 and so on are installed above the main frame 1 and a rear frame 1b, and the upper bracket 3 for coupling the front fork is provided with a steering device 27.

[Configuration of the Rear Wheel 16]

Figure 2:
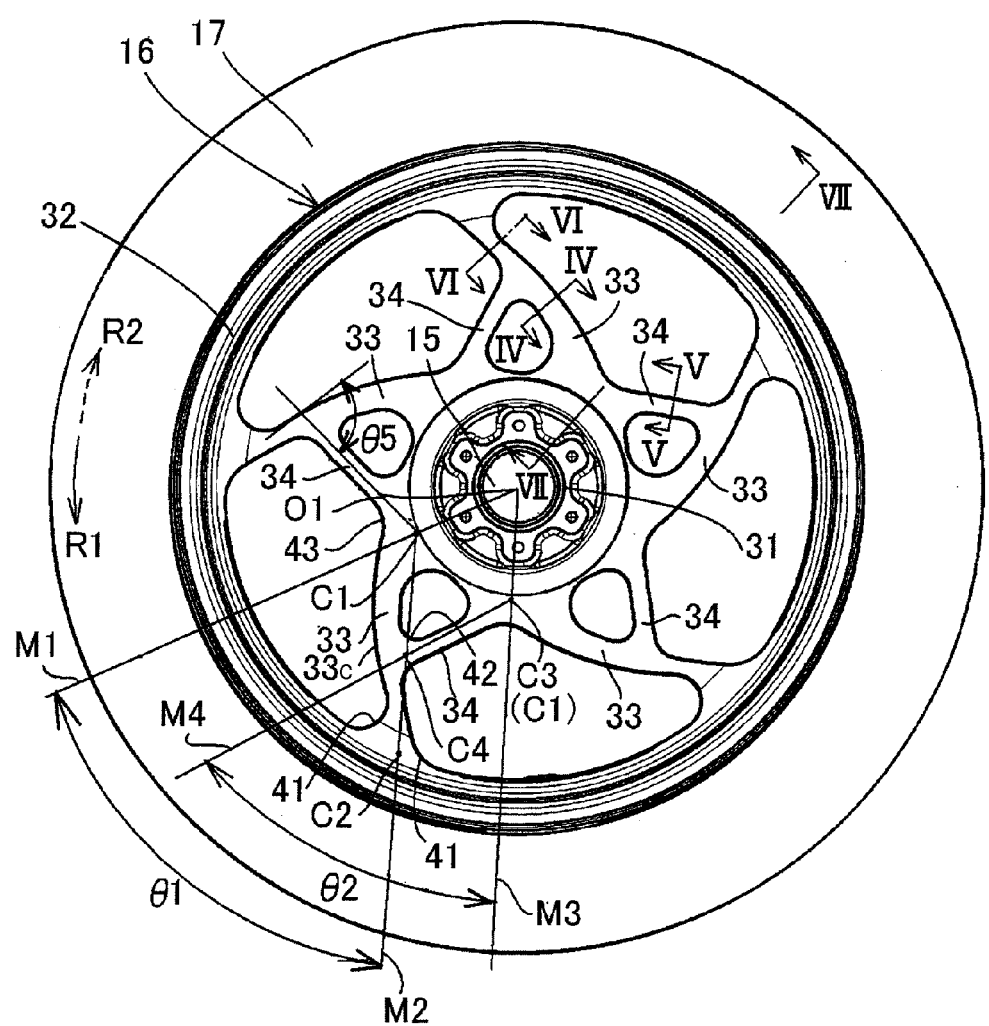
FIG. 2 is an enlarged left side view showing a rear wheel of the motorcycle in FIG. 1.
Figure 3:
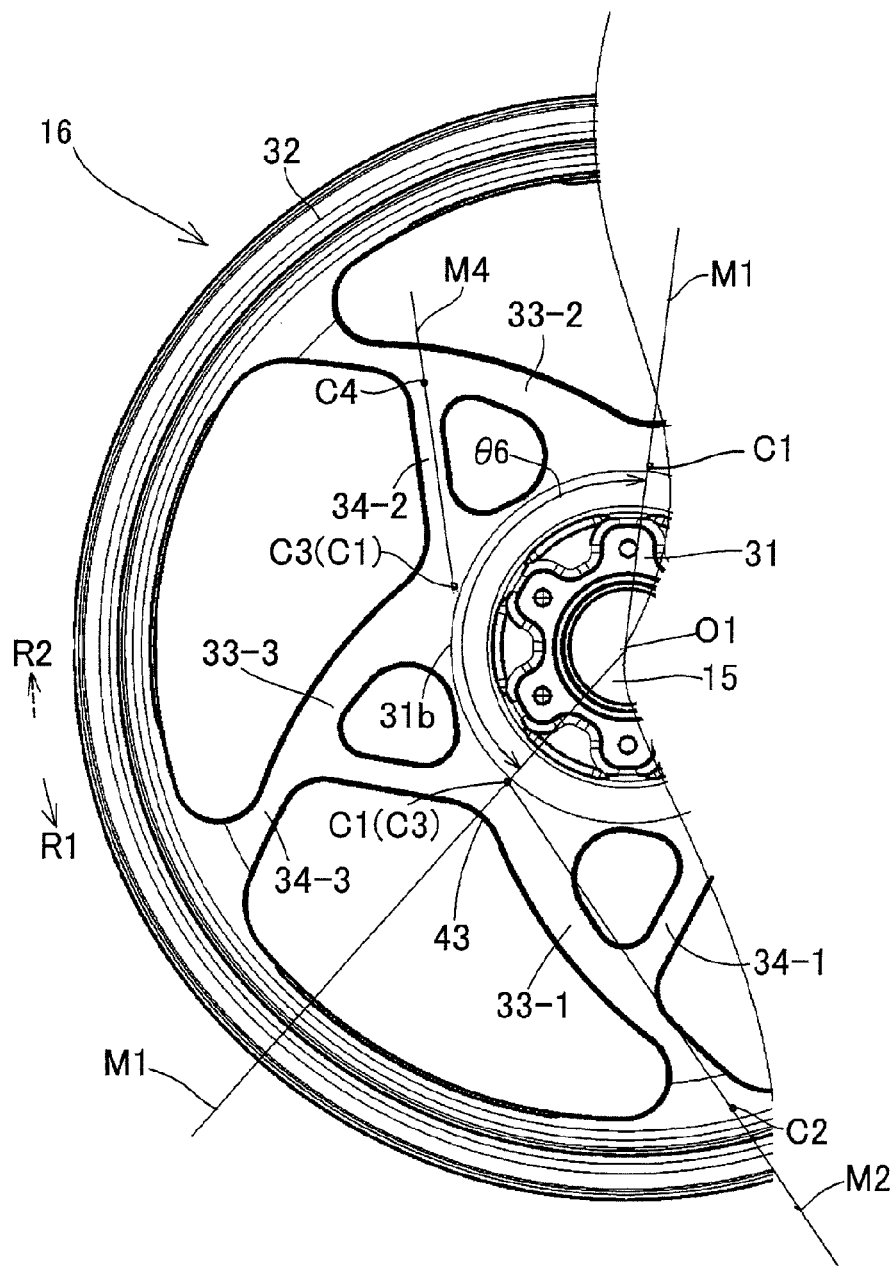
FIG. 3 is an enlarged left side view of a front half of the rear wheel in FIG. 2.
Figure 4:
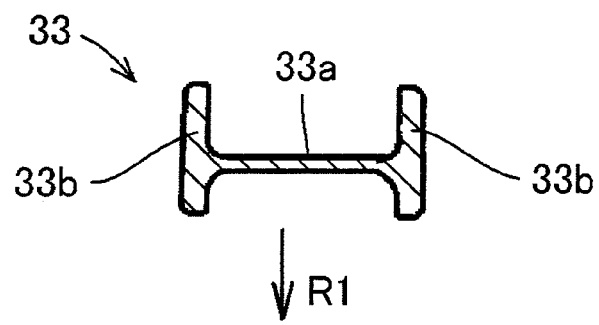
FIG. 4 is an enlarged sectional view taken along IV-IV of the rear wheel in FIG. 2.
Figure 5:
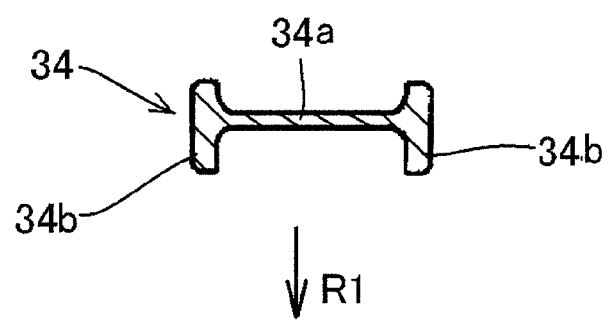
FIG. 5 is an enlarged sectional view taken along V-V of the rear wheel in FIG. 2.
Figure 6:
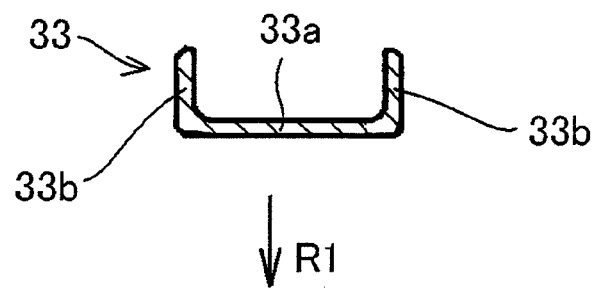
FIG. 6 is an enlarged sectional view taken along VI-VI of the rear wheel in FIG. 2.
Figure 7:
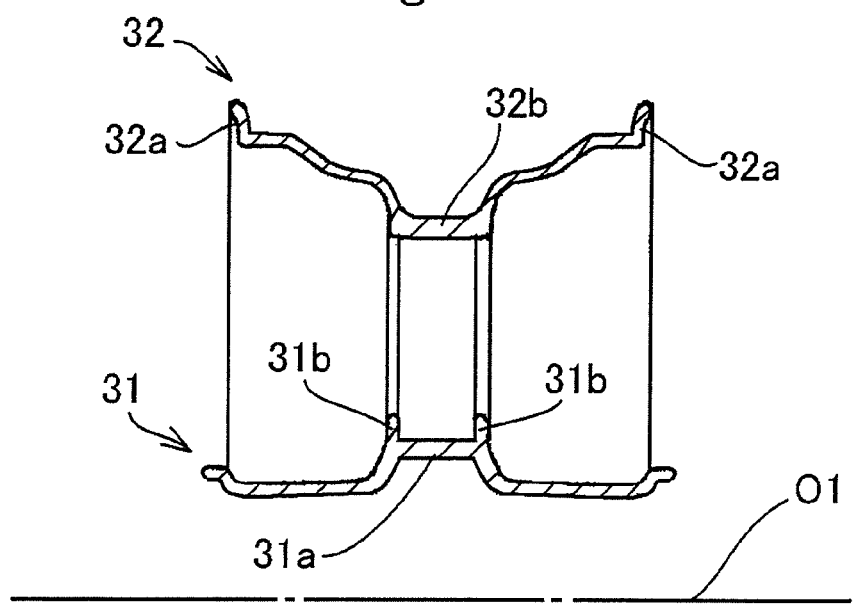
FIG. 7 is a sectional view taken along VII-VII of the rear wheel in FIG. 2.
Figure 8:
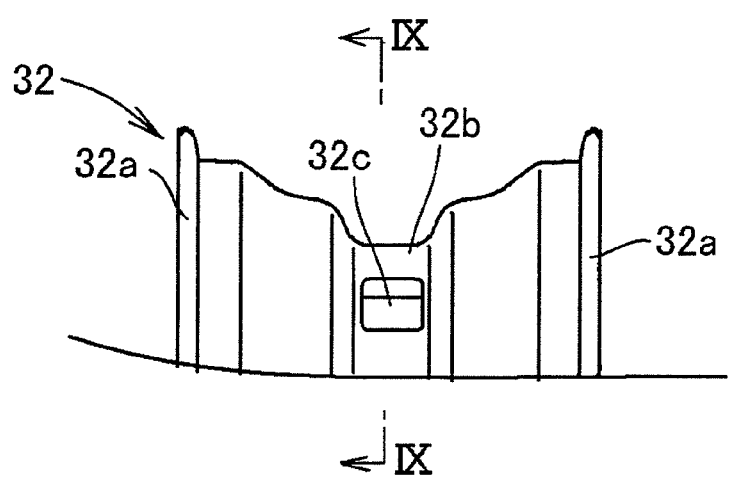
FIG. 8 is a partial front view showing a rim of the rear wheel in FIG. 2.
Figure 9:
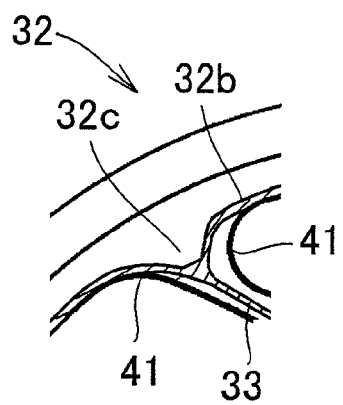
FIG. 9 is a sectional view taken along IX-IX in FIG. 8.

FIG. 2 is an enlarged left side view showing a rear wheel in FIG. 1, FIG. 3 is an enlarged left side view showing a front half of the rear wheel 16, FIG. 4, FIG. 5 and FIG. 6 are enlarged sectional view taken along IV-IV, V-V and VI-VI in FIG. 2, respectively, FIG. 7 is a sectional view taken along VII-VII in FIG. 2, FIG. 8 is a partial front view showing a rear rim, and FIG. 9 is a sectional view taken along IX-IX in FIG. 8. A configuration of the rear wheel 16 will be described in detail with reference to these figures.

In FIG. 2, the rear wheel 16 integrally includes a rear hub 31 rotatably supported by the rear axle 15, a rear rim 32 to which the rear tire 17 is attached, and a plurality of rear spokes 33 and 34 connecting the rear hub 31 to the rear rim 32. In the embodiment, a wheel formed by cutting a magnesium cast molded product is used as the rear wheel 16 to reduce its weight. However, for mass production, aluminum alloy, a stainless steel or a cast iron can be also used.

The plurality of rear spokes 33 and 34 include five rear main spokes 33 that directly couple the rear hub 31 to the rear rim 32 and are arranged at regular intervals in a wheel circumferential direction, and five rear sub spokes 34 that couple each rear main spoke 33 to a rear hub 34. Each of the rear sub spokes 34 is connected with an intermediate portion of the corresponding rear main spoke 33.

Each of the rear main spokes 33 extends from an outer circumferential surface of the rear hub 31 to an inner circumferential surface of the rear rim 32, and is inclined toward a wheel rotating direction (rotating direction during forward running) R1 outwardly in a wheel radial direction. Specifically, a straight line M2 connecting a center point C1 of a coupling portion between each of the rear main spokes 33 and the rear hub 31 to a center point C2 of a coupling portion between an outer circumferential end of each of the rear main spokes 33 and the rear rim 32 is inclined relative to a straight line M1 connecting a wheel rotational center O1 to the center point C1 of the coupling portion between each of the rear main spokes 33 and the rear hub 31 by an angle θ1 toward the rotating direction R1. The inclined angle θ1 is, for example, about 45 degrees to 90 degrees.

Further, each of the rear main spokes 33 is curved so as to expand toward an inverse rotating direction R2 with respect to the straight line M2 connecting the center points C1 and C2 of the coupling portion on inner and outer sides in the radial direction of the rear main spokes 33. Especially, the shape of an edge 33c of each of the rear main spokes 33 toward the inverse rotating direction R2 clearly expresses the curved shape. However, a portion of the rear main spoke 33 outside a center C4 of the coupling portion between the rear sub spoke 34 and the rear main spoke 33 in the wheel radial direction is substantially linearly formed.

Each of the rear main spokes 33 is tapered such that its width (size) in the wheel circumferential direction becomes smaller toward the outer side. Edges on the sides of the rotating direction R1 and the inverse rotating direction R2 of the outer circumferential end of the rear main spoke 33 in the wheel radial direction each are connected to an inner circumferential surface of the rear rim 32 via an R surface 41.

Each of the rear sub spokes 34 is arranged toward the rotating direction R1 (inclined side of the rear main spokes) with respect to the coupled rear main spokes 33. Each of the rear sub spokes 34 extends from an outer circumferential surface of the rear hub 31 to a substantially intermediate portion of the rear main spokes 33 in the longitudinal direction. Each of the rear sub spokes 34 is inclined toward the opposite side to the inclined side of the rear main spoke 33 outwardly in the wheel radial direction. That is, each of the rear sub spokes 34 is inclined toward the side of the inverse rotating direction R2. Specifically, a straight line M4 connecting a center point C3 of a coupling portion between each of the rear sub spokes 34 and the rear hub 31 to a center point C4 of a coupling portion between each of the rear sub spokes 34 and each of the rear main spokes 33 is inclined toward the inverse rotating direction R2 by an angle θ2 with respect to a straight line M3 connecting the wheel rotational center O1 to the center point C3 of the coupling portion between each of the rear sub spokes 34 and the rear hub 31. The inclined angle θ2 is, for example, about 45 degrees to 90 degrees.

The rear main spokes 33 are curved, whereas the rear sub spokes 34 are substantially linear, and the width (size) of each of the rear sub spokes 34 in the wheel circumferential direction is almost uniform all over its whole length in the radial direction. Inner and outer edges in the wheel radial direction of the end of each of the rear sub spokes 34 toward the inverse rotating direction R2 are connected to each of the rear main spokes 33 via an R surface 42. In the coupling portion between each of the rear main spokes 33 and each of the rear sub spokes 34, a crossed angle θ5 of the rear sub spoke 34 with respect to the edge 33c of the rear main spoke 33 toward the inverse rotating direction R2 is set to a right or nearly right angle.

Further, the edge in the inverse rotating direction R2 of the inner end of each of the rear main spokes 33 in the wheel radial direction is smoothly connected to the edge in the rotating direction R1 of the inner end of the rear sub spoke 34 adjacent to the rear main spoke 33 toward the inverse rotating direction R2 via an R surface 43 formed on an outer circumferential end of the rear hub 31.

In FIG. 4, each of the rear main spokes 33 includes a pair of side wall portions (rib portions) 33b opposed to each other with a distance therebetween in the axle direction, and a web 33a integrally coupling the side wall portions 33b to each other, and has a H-shaped cross section. However, a portion of the rear main spoke 33, which is further from the wheel rotational center than the coupling portion with the rear sub spoke 34 in FIG. 2 in the wheel radial direction, as shown in FIG. 6, has a C-shaped cross section. By making the cross section of each of the rear main spokes 33 H-shaped or C-shaped, curve rigidity as well as a natural frequency of the rear wheel 16 are increased while suppressing an increase in weight.

In FIG. 5, like the rear main spokes 33, each of the rear sub spokes 34 includes a pair of side wall portions 34b opposed to each other with a distance therebetween in the axle direction and a web 34a integrally coupling the side wall portions 34b to each other. Although the rear sub spokes 34 each have a H-shaped cross section in the embodiment in FIG. 5, it may be shaped like a rib having a protruding portion (e.g., the side wall portions 34b) with a C-shaped, T-shaped or L-shaped cross section, which protrudes in the radial direction. By forming the cross section of each of the rear sub spokes 34 so as to have the protruding portion protruding in the radial direction in this manner, like the rear main spokes 33, curve rigidity as well as the natural frequency of the rear wheel 16 are increased.

In FIG. 7, the rear hub 31 has a cylindrical hub body 31a, and protruding portions 31b protruding outwardly in the wheel radial direction are integrally formed at both respective axial ends of an outer circumferential surface of the hub body 31a. The protruding portions 31b are formed all over almost the entire circumference of the hub body 31a in the shape of a flange. The above-mentioned R surface, that is, the R surface 43 connecting the edge in the inverse rotating direction R2 of the inner end of the rear main spoke 33 in the wheel radial direction to the edge in the rotating direction R1 of the inner end of the rear sub spoke 34 in the wheel radial direction is formed on the outer circumferential edge of the protruding portions 31b.

In FIG. 8, the rear rim 32 is integrally provided with annular protrusions 32a restricting the position of the rear tire 17 in the axle direction at both respective ends in the axle direction, and an annular recess 32b recessed inwardly in the wheel radial direction so as to have a substantially rectangular cross section at the center in the axle direction all over the circumference of the rim, thereby improving the rigidity and the natural frequency of the rear rim 32 while suppressing an increase in weight.

In FIG. 9, a coupling recess 32c recessed inwardly in the wheel radial direction from a bottom of the annular recess 32b is formed in a coupling portion between the bottom of the annular recess 32b of the rear rim 32 and the outer end of each of the rear main spokes 33 in the wheel radial direction, thereby further reducing the weight of the rear rim 32.

Here, to describe positional relationship between a given rear main spoke 33 and the rear sub spoke 34 coupled to another rear main spoke 33 after the next in the inverse rotating direction R2, the given rear main spoke 33 is assumed as follows on the basis of FIG. 3.

The rear main spoke located at the lower end in FIG. 3 and the rear sub spoke coupled thereto are referred to as the first rear main spoke 33-1 and the first rear sub spoke 34-1, respectively. The rear main spoke and the rear sub spoke that are arranged toward the inverse rotating direction R2 with respect to the first rear main spoke 33-1 and the first rear sub spoke 34-1 across one rear main spoke and one rear sub spoke are referred to as the second rear main spoke 33-2 and the second rear sub spoke 34-2, respectively. The rear main spoke and the rear sub spoke arranged between the first rear main spoke 33-1 and the second rear sub spoke 34-2 are referred to as the third rear main spoke 33-3 and the third rear sub spoke 34-3, respectively. As a matter of course, the names are set for convenience of explanation, and any rear main spoke 33 and rear sub spoke 34 can be referred to as the first rear main spoke and the first rear sub spoke, respectively.

The first rear main spoke 33-1 and the second rear sub spoke 34-2 are arranged such that a load received by the first rear main spoke 33-1 from a road surface (especially, a load in the longitudinal direction of the rear main spoke 33-1) is transmitted as a load in the longitudinal direction of the second rear sub spoke 34-2 via a part of the outer circumferential end of the rear hub 31. Specifically, the straight line M4 connecting the inner and outer circumferential ends of the second rear sub spoke 34-2 (the center points C3 and C4 of the inner and outer coupling portions) to each other is arranged substantially on an extension of a curved line segment extending from the rear rim 32 to the rear hub 31 in the longitudinal direction of the first rear main spoke 33-1. That is, the center point C3 of the coupling portion between the second rear sub spoke 34-2 and the rear hub 31 and the center point C4 of the coupling portion between the second rear sub spoke 34-2 and each of the second rear main spokes 33 exist on the extension, and the second rear sub spoke 34-2 extends along the extension outwardly in the wheel radial direction so as to pass from the center point C3 to the center point C4.

The center point C1 of the coupling portion between the first rear main spoke 33-1 and the rear hub 31 and the center point C3 of the coupling portion between the second rear sub spoke 34-2 and the rear hub 31 are connected to each other via the outer circumferential protruding portions 31b of the rear hub 31.

The first rear main spoke 33-1, as described above, is curved to expand toward the inverse rotating direction R2. Specifically, the first rear main spoke 33-1 is curved so as to be smoothly connected to an arcuate outer circumference of the rear hub 31 extending from the coupling portion between the second rear sub spoke 34-2 and the rear hub 31 to the coupling portion between the first rear main spoke 33-1 and the rear hub 31.

Although the third rear main spoke 33-3 is arranged between the first rear main spoke 33-1 and the second rear main spoke 33-2 in the wheel circumferential direction, the center point C3 of the coupling portion between the second rear sub spoke 34-2 and the rear hub 31 substantially overlaps with the center point C1 of the coupling portion between the third rear main spoke 33-3 and the rear hub 31 in the wheel circumferential direction.

The center point C1 of the coupling portion between the first rear main spoke 33-1 and the rear hub 31 is separated from the center point C1 of the coupling portion between the second rear main spoke 33-2 and the rear hub 31 by 90 degrees or larger in the inverse rotating direction R2. That is, an angle θ6 between the two straight lines M1 and M1 in FIG. 3 is set to be no less than 90 degrees and less than 180 degrees.

[Configuration of the Front Wheel 6]

Figure 10:
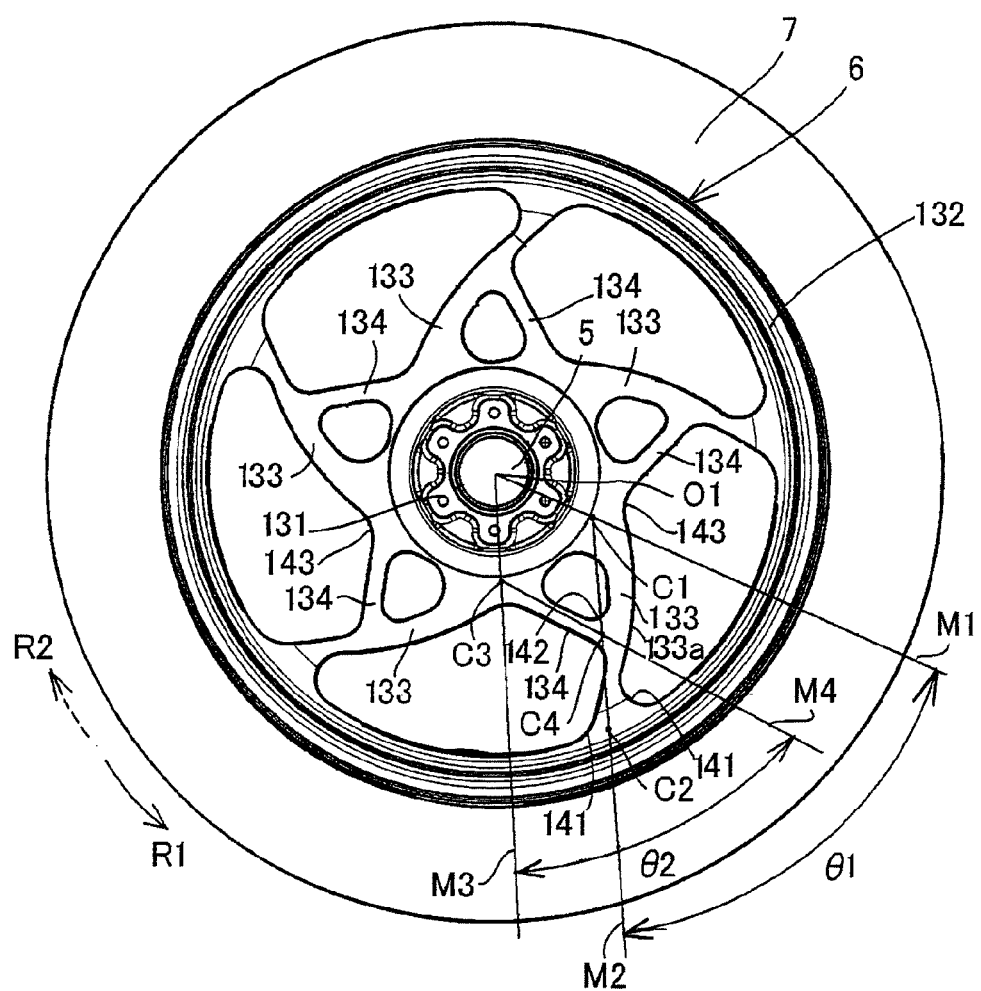
FIG. 10 is a left side view showing a front wheel of the motorcycle in FIG. 1.
Figure 11:
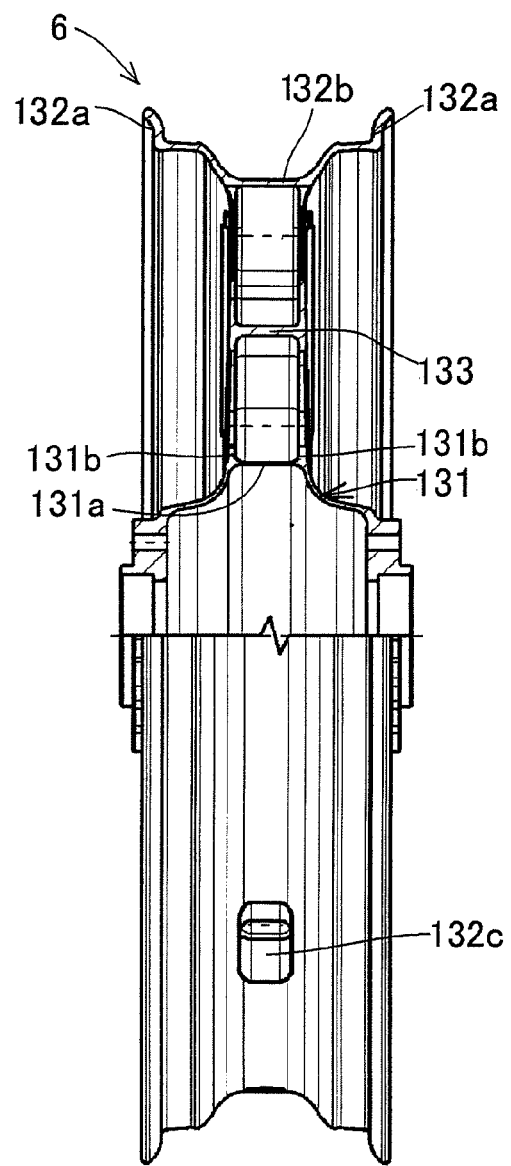
FIG. 11 is a front sectional view showing an upper half of the front wheel in FIG. 10.

FIG. 10 is an enlarged left side view of the front wheel, and FIG. 11 is a front view (sectional view of the upper half) of the front wheel 6. In FIG. 10, the front wheel 6 integrally includes a front hub 131 rotatably supported by the front axle 5, a front rim 132 to which the front tire 7 is attached, and a plurality of front spokes 133 and 134 coupling the front hub 131 to the front rim 132. The material for the front wheel 6 is the same as that for the rear wheel 16, and is formed as a magnesium cast molded product to reduce its weight. However, aluminum alloy, stainless steel or cast iron can be used.

As in the rear wheel 16, the front spokes 133 and 134 of the front wheel 6 include the five front main spokes 133 arranged at regular intervals in the wheel circumferential direction and the five front sub spokes 134 integrally coupled to the respective main spokes 133. The front main spokes 133 and the front sub spokes 134 of the front wheel 6 are different from the rear main spokes 33 and the rear sub spokes 34 of the rear wheel 16 in that the inclined directions in the wheel circumferential direction are opposed to each other, and the other configuration is the same as that of the rear wheel 16. That is, the front main spokes 133 of the front wheel 6 are inclined toward the inverse rotating direction R2 outwardly in the wheel radial direction and are curved so as to expand toward the rotating direction R1, whereas the front sub spokes 134 of the front wheel 6 are inclined toward the rotating direction R1 outwardly in the wheel radial direction and are linearly formed.

As in the rear wheel 16, R surfaces 141, 142, and 143 are formed in coupling portions between inner and outer circumferential ends of the front main spokes 133 in the radial direction, and the front main spokes 133 and the front sub spokes 134.

In FIG. 11, like the rear hub 31, the front hub 131 includes a cylindrical hub body 131a, and a protruding portion 131b protruding outwardly in the wheel radial direction is integrally formed at each axial end of an outer circumferential surface of the hub body 31a. The protruding portions 131b are formed over substantially the entire circumference of the hub body 131a in the shape of a flange.

Like the rear rim 32, the front rim 132 is integrally provided with annular protrusions 132a restricting the position of the rear tire 17 in the axle direction at both respective ends in the axle direction, and an annular recess 132b recessed inwardly in the wheel radial direction so as to have a substantially rectangular cross section at the center in the axle direction all over the circumference of the rim, thereby improving the rigidity and the natural frequency of the rear rim 32 while suppressing an increase in weight.

Further, a coupling recess 132c recessed inwardly in the wheel radial direction from a bottom of the annular recess 132b is formed in a coupling portion between the bottom of the annular recess 132b of the front rim 132 and the outer end of each of the front main spokes 133 in the wheel radial direction, thereby further reducing the weight of the front rim 132.

[Effects of the First Embodiment]

(1) In FIG. 2, during driving, a load (torsional load in the wheel circumferential direction) that relatively displaces the rear rim 32 with respect to the rear hub 31 around the wheel rotational center O1 occurs. However, since the rear main spokes 33 are inclined, a bending load, that is, a load in a direction orthogonal to the wheel radial direction or a load in a direction orthogonal to the longitudinal direction in the rear main spokes 33, and a compressive load in the longitudinal direction of the rear main spokes 33 can be applied to the rear main spokes 33. In this case, as compared to the case where all loads are received by the rigidity in the bending direction of each spoke, the loads are also received by the rigidity in the compressing direction, thereby suppressing deformation of the rear main spokes 33 and improving the rigidity of the rear wheel 16 in the rotating direction.

(2) In FIG. 2, since the rear main spokes 33 extending from the rear hub 31 to the rear rim 32 are inclined toward the rotating direction R1 outwardly in the wheel radial direction, during driving, in particular, at acceleration, the rear main spokes 33 can receive the bending load as well as the compressive load in the longitudinal direction of the rear main spokes 33. Thus, it is possible to suppress deformation of the rear main spokes 33, and improve the rigidity of the rear wheel 16 in the rotating direction during driving.

(3) Especially the rear main spokes 33 and the rear sub spokes 34 that extend from the rear hub 31 to the middle of the respective rear main spokes 33 and are inclined in the direction opposite to the inclined direction of the rear main spokes 33 are integrally provided. Therefore, deformation of each of the rear main spokes 33 can be suppressed by the rear sub spokes 34 coupled to the respective rear main spokes 33. As a result, the number of rear main spokes can be reduced, and the rigidity of the rear wheel in the rotating direction can be increased while reducing the weight of the rear wheel. Moreover, the natural frequency of the rear wheel can be also increased.

Specifically, by forming the rear sub spokes 34 to support the respective rear main spokes 33, the rigidity of the rear main spokes 33 on the inner side in the wheel radial direction can be increased. Therefore, an advantageous effect of improving the rigidity of the wheels can be obtained, as compared to the increase in the moment of inertia of the real wheel 16 around the wheel rotational center, which is caused by the arrangement of the rear sub spokes 34.

(4) Further, since each of the rear sub spokes 34 supports the rear main spoke 33 from its inclined direction, when the rear main spokes 33 are subjected to the bending load, the rear sub spokes 34 can receive the bending load of the rear main spokes 33 as the compressive load (or pulling load), thereby further suppressing bending deformation of the rear main spokes 33. In this manner, the increase in the mass of the rear wheel can be suppressed, thereby suppressing the increase in the moment of inertia to improve the rigidity of the wheels around the wheel rotational center. When the rigidity of the rear wheel 16 is improved as described above, the grip state or the slip state of the rear tire 17 during driving is properly transmitted to the rider, that is, feedback to the rider is properly performed, and the rider can properly recognize the ground state and the driving state. Further, by suppressing the moment of inertia of the rear wheel, circling stability can be maintained.

(5) As shown in FIG. 3, the first rear main spoke 33-1 and the second rear sub spoke 34-2 connected to the second rear main spoke 33-2 next to the first rear main spoke 33-1 across one main spoke are arranged such that the load applied from the road surface to the first rear main spoke 33-1 is transmitted to the second rear sub spoke 34-2. Therefore, the load transmitted from the road surface to the first rear main spoke 33-1 can be distributed to the second rear main spoke 33-2 and the rear rim 32 via the second rear sub spoke 34-2 without concentrating the load on the rotational center of the rear hub 31, thereby suppressing deformation of the first rear main spoke 33-1.

(6) As shown in FIG. 3, the second rear sub spoke 34-2 is arranged substantially on the extension of the line segment extending from the rear rim 32 to the rear hub 31 in the longitudinal direction of the first rear main spoke 33-1. Therefore, the load transmitted from the road surface to the first rear main spoke 33-1 is transmitted along the longitudinal direction of the first rear main spoke 33-1, is received by the second rear sub spoke 34-2, and is distributed to the rear rim 32 and the second rear main spoke 33-2. This can suppress deformation of the first rear main spoke 33-1. Especially, since the center point C3 of the coupling portion between the second rear sub spoke 34-2 and the rear hub 31 exists on the extension of the line segment extending from the rear rim 32 to the rear hub 31 in the longitudinal direction of the first rear main spoke 33-1, and the second rear sub spoke 34-2 extends along the extension outwardly in the wheel radial direction, the load applied from the road surface to the first rear main spoke 33-1 is easily distributed to the second rear sub spoke 34-2, further suppressing deformation of the first rear main spoke 33-1.

(7) As shown in FIG. 3, the coupling portion between the first rear main spoke 33-1 and the rear hub 31 (center point C1) is connected with the coupling portion between the second rear sub spoke 34-2 and the rear hub 31 (center point C3) via the outer circumference of the rear hub 31. Therefore, the second rear sub spoke 34-2 can be shortened, thereby possibly reducing the weight of the rear wheel and further suppressing deformation of the first rear main spoke 33-1. Especially, as shown in FIG. 7, by forming the annular protruding portions 31b on the outer circumference of the cylindrical hub body 31a, the rigidity of the rear hub 31 can be improved, and deformation of the rear hub 31 can be prevented. As a result, the efficiency of transmitting the load from the first rear main spoke 33-1 to the second rear sub spoke 34-2 is further improved.

(8) As shown in FIG. 3, the first rear main spoke 33-1 is curved so as to be smoothly connected to the arcuate outer circumference of the rear hub 31 extending from the coupling portion between the second rear sub spoke 34-2 and the rear hub 31 to the coupling portion between the first rear main spoke 33-1 and the rear hub 31. For this reason, the load transmitted to the first rear main spoke 33-1 is easy to distribute to the second rear sub spoke 34-2, thereby further suppressing deformation of the first rear main spoke 33-1.

(9) Since another third rear main spoke 33-3 is arranged between the first rear main spoke 33-1 and the second rear main spoke 33-2 in the wheel circumferential direction, for example, the coupling portion between the second rear sub spoke 34-2 and the second rear main spoke 33-2 can be separated from the rear hub 31 outwardly in the wheel radial direction, thereby improving the rigidity of the rear wheel 16 around the wheel rotational center. Especially, since the coupling portion between the second rear sub spoke 34-2 and the rear hub 31 (center point C3) and the coupling portion between the third rear main spoke 33-3 and the rear hub 31 (center point C1) overlap with each other in the wheel circumferential direction, the rigidity of the coupling portion between the second rear sub spoke 34-2 and the rear hub 31 can be increased. Further, since the second rear sub spoke 34-2 extends from the coupling portion between the third rear main spoke 33-3 and the rear hub 31, the length of the second rear sub spoke 34-2 can be decreased.

(10) Since the coupling portion between the second rear main spoke 33-2 and the rear hub 31 (center point C1) is separated from the coupling portion between the first rear main spoke 33-1 and the rear hub 31 (center point C1) by 90 degrees or larger in the wheel circumferential direction, the load received by the first rear main spoke 33-1 can be transmitted to the rear hub 31 on the opposite side to the rear axle 15, and be easily distributed to the second rear sub spoke 34-2, thereby further suppressing deformation of the first rear main spoke 33-1.

(11) In FIG. 2, since each of the rear main spokes 33 is tapered such that its size in the wheel circumferential direction becomes smaller toward the outer side in the wheel radial direction while maintaining the rigidity around the wheel rotational center O1, it is possible to reduce the weight of the rear wheel 16 and suppress the increase in the moment of inertia. This also applies to the front wheel 6.

(12) As shown in FIG. 8, an annular recess 32b is recessed inwardly in the wheel radial direction so as to have a substantially rectangular cross section at the center in the axle width direction of the rear rim 32 all over the circumference of the rear rim 32, thereby improving the rigidity of the rear rim 32 while suppressing an increase in the weight of the rear rim 32. The front rim 132 can confer the same advantage.

(13) In the motorcycle shown in FIG. 1, the rear main spokes 33 of the rear wheel 16 are inclined toward the rotating direction R1 outwardly in the wheel radial direction, and the front main spokes 133 of the front wheel 6 are inclined toward the inverse rotating direction R2 outwardly in the wheel radial direction. Thus, the rear wheel, when receiving a large load from the road surface during driving such as at acceleration, can receive the driving load as the load in the longitudinal direction of the rear main spokes 33, whereas the front wheel, when receiving a large load from the road surface at braking, can receive the braking load as the load in the longitudinal direction of the front main spokes 133 at braking.

(14) As shown in FIG. 4 and FIG. 6, since the rear main spokes 33 each have the protruding portion (33b) protruding in the radial direction at each end in the vehicle width direction, and, for example, have an H-shaped or C-shaped cross section, the rigidity of the rear main spokes 33 can be improved without increasing weight.

(15) As shown in FIG. 5, since the rear sub spokes 34 each have the protruding portion (34b) protruding in the radial direction at each end in the vehicle width direction, and, for example, have an H-shaped cross section, the out-of-plane rigidity of the rear sub spokes 34 can be improved without increasing weight.

(16) In FIG. 2, since the rear sub spokes 34 in the embodiment are linearly formed when viewed in the axle direction, the rear wheel can be easily manufactured.

(17) In FIG. 2, since the outer edge of the rear main spoke 33 in the wheel radial direction is connected with the inner circumferential surface of the rear rim 32 via the R surface 41, stress concentration on the coupling portion between each of the rear main spokes 33 and the rear rim 32 can be alleviated, thereby improving the strength of the rear wheel. Alternatively, the outer edge of the rear main spoke 33 in the wheel radial direction may be shaped to substantially linearly extend in the circumferential direction in the shape of a character "inverted V shape" (funnel shape) or extend in the circumferential direction in the shape of a character T.

(18) As shown in FIG. 2, since the rear main spokes 33 are curved, the bending load received by the rear main spokes 33 can be reduced, and the compressive or pulling load in the longitudinal direction of the rear main spokes 33 can be increased. Preferably, in the coupling portion between each of the rear main spokes 33 and the rear rim 32, and the coupling portion between each of the rear main spokes 33 and the rear hub 31, the dimension extending in the wheel circumferential direction is larger than the dimension extending in the wheel radial direction.

(19) In the motorcycle as shown in FIG. 1, by merely exchanging the front wheel 6 and/or the rear wheel 16, lap times in races and the like can be changed.

In the first embodiment, the following effects can also be expected. Some effects may overlap with the above-mentioned effects, but are described for completeness.

(1) In the rear wheel 16 on the driving side in FIG. 2, since the rear main spokes 33 directly coupling the rear hub 31 to the rear rim 32 are inclined toward the rotating direction R1 outwardly in the wheel radial direction, and are curved so as to expand toward the inverse rotating direction R2, the driving load applied to the rear wheel can be received as the compressive load in the longitudinal direction of the rear main spokes 33, thereby improving the rigidity for the driving load while reducing the weight of the rear wheel 16.

(2) In the front wheel 6 on the driven side in FIG. 10, since the front main spokes 133 directly coupling the front hub 131 to the front rim 132 are inclined toward the inverse rotating direction R2 outwardly in the wheel radial direction, and are curved toward the rotating direction R1, the braking load of the front wheel as a driven wheel can be received as the compressive load in the longitudinal direction of the front main spokes 133, thereby improving the rigidity for the braking load while reducing the weight of the front wheel 6.

(3) Since the rear spokes shown in FIG. 2 include the rear main spokes 33 that extend from the rear hub 31 to the rear rim 32, are inclined toward the rotating direction R1, and are curved toward the inverse rotating direction R2, and the rear sub spokes 34 that extend from the rear hub 31 to the rear main spokes 33, and are inclined toward the inverse rotating direction R2, during driving, especially at acceleration, the bending load applied to the rear main spokes 33 can be supported by the rear sub spokes 34, thereby suppressing deformation of the rear main spokes 33 and improving the rigidity of the rear wheel 16 in the rotating direction during driving.

Specifically, by forming the rear sub spokes 34 to support the respective rear main spokes 33, the rigidity of the rear main spokes 33 on the inner side in the wheel radial direction can be increased, and as compared to the increase in the moment of inertia of the rear wheel 16 around the wheel rotational center, which is caused by the arrangement of the rear sub spokes 34, an advantageous effect of improving the rigidity of the wheels can be obtained.

(4) Further, since each of the rear sub spokes 34 supports the corresponding rear main spokes 33 from the inclined direction, when the rear main spokes 33 are subjected to the bending load, the rear sub spokes 34 can receive the bending load of the rear main spokes 33 as the compressive load, thereby further suppressing bending deformation of the rear main spokes 33. In this manner, the increase in the weight of the wheels is suppressed, thereby improving the rigidity of the wheels around the wheel rotational center while suppressing the increase in the moment of inertia.

(5) When the rigidity of the rear wheel 16 is improved as described above, the grip state or the slip state of the rear tire 17 during driving is properly transmitted to the rider, that is, feedback to the rider is properly performed, and the rider can properly recognize the ground state and the driving state. Further, by suppressing the moment of inertia of the rear wheel 16, circling stability can be maintained.

(6) As shown in FIG. 3, since the first rear main spoke 33-1 and the second rear sub spoke 34-2 connected to the second rear main spoke 33-2 next to the first rear main spoke 33-1 across one rear main spoke are arranged such that the load applied from the road surface to the first rear main spoke 33-1 is transmitted to the second rear sub spoke 34-2, the load transmitted from the road surface to the first rear main spoke 33-1 can be distributed to the second rear main spoke 33-2 and the rim 32 without concentrating the load on the rotational center of the rear hub 31 via the second rear sub spoke 34-2, thereby suppressing deformation of the first rear main spoke 33-1. The front wheel 6 in FIG. 10 can achieve the same effects.

(7) As shown in FIG. 3, since the second rear sub spoke 34-2 is arranged substantially on the extension of the line segment extending from the rear rim 32 to the rear hub 31 in the longitudinal direction of the first rear main spoke 33-1, the load transmitted from the road surface to the first rear main spoke 33-1 is transmitted along the longitudinal direction of the first rear main spoke 33-1, is received by the second rear sub spoke 34-2, and is distributed to the rear rim 32 and the second rear main spoke 33-2, thereby suppressing deformation of the first rear main spoke 33-1. Especially, since the center point C3 of the coupling portion between the second rear sub spoke 34-2 and the rear hub 31 exists on the extension of the line segment extending from the rear rim 32 to the rear hub 31 in the longitudinal direction of the first rear main spoke 33-1, and the second rear sub spoke 34-2 extends along the extension outwardly in the wheel radial direction, the load applied from the road surface to the first rear main spoke 33-1 is easily distributed to the second rear sub spoke 34-2, further suppressing deformation of the first main spoke 33-1. The front wheel 6 in FIG. 10 can obtain the same effects.

(8) In FIG. 2 and FIG. 10, since the rear sub spokes 34 and the front sub spokes 134 are linearly formed when viewed in the axle direction, the rear wheel 16 and the front wheel 6 can be easily manufactured.

[Modification Example of the Wheel]

Figure 12:
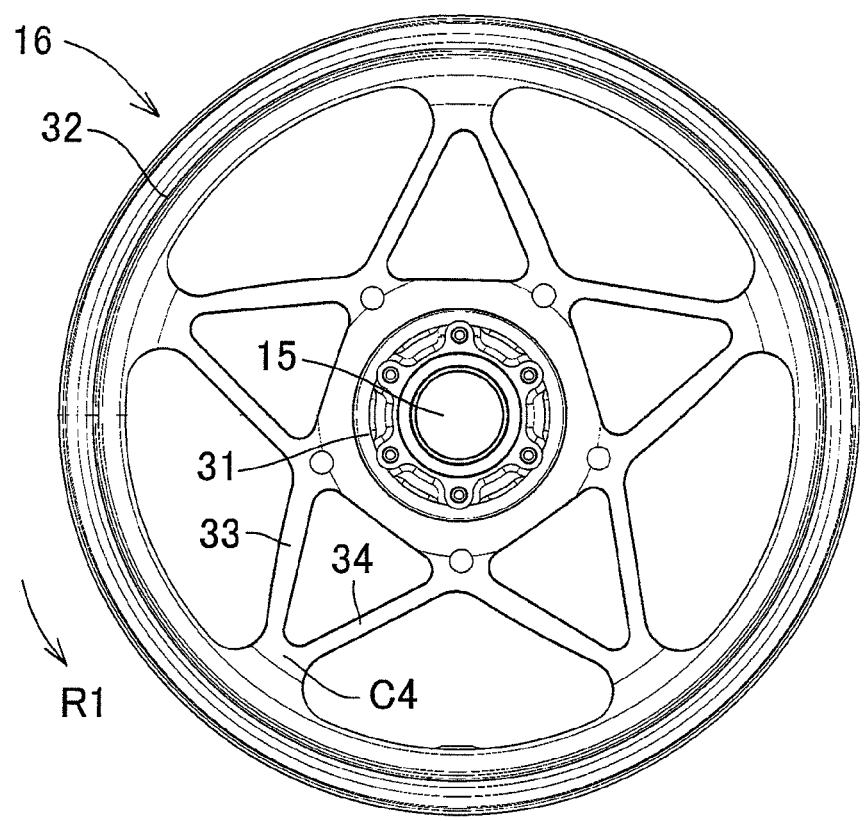
FIG. 12 is a left side view showing a modification example of the rear wheel according to the present invention.
Figure 13:
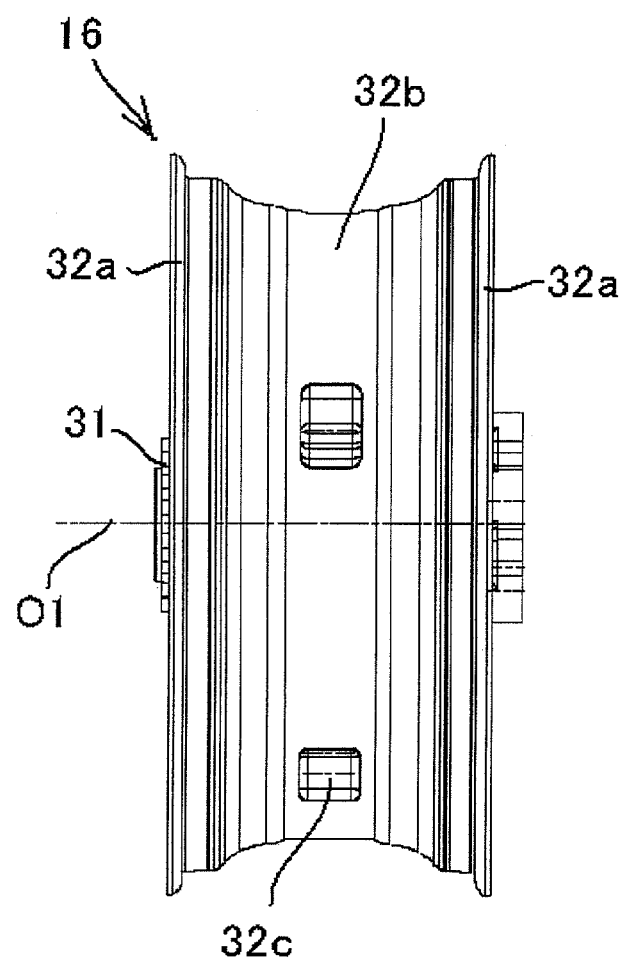
FIG. 13 is a front view showing the rear wheel in FIG. 12.

(1) FIG. 12 is a left side view showing a modification example of the rear wheel 16, and FIG. 13 is a front view of the rear wheel 16 in FIG. 12. In FIG. 12, the rear spokes include the rear main spokes 33 and the rear sub spokes 34 connected to the respective rear main spokes 33 as in FIG. 2, but the coupling portion (center point C4) between each of the rear main spokes 33 and the rear sub spoke 34 is set in the vicinity of the outer edge of the rear main spoke 33 in the wheel radial direction. Other configurations are the same as those in FIG. 2, and the same components are given the same reference numerals. As a matter of course, the wheel configuration in FIG. 12 and FIG. 13 can be applied to the front wheel 6.

Figure 14:
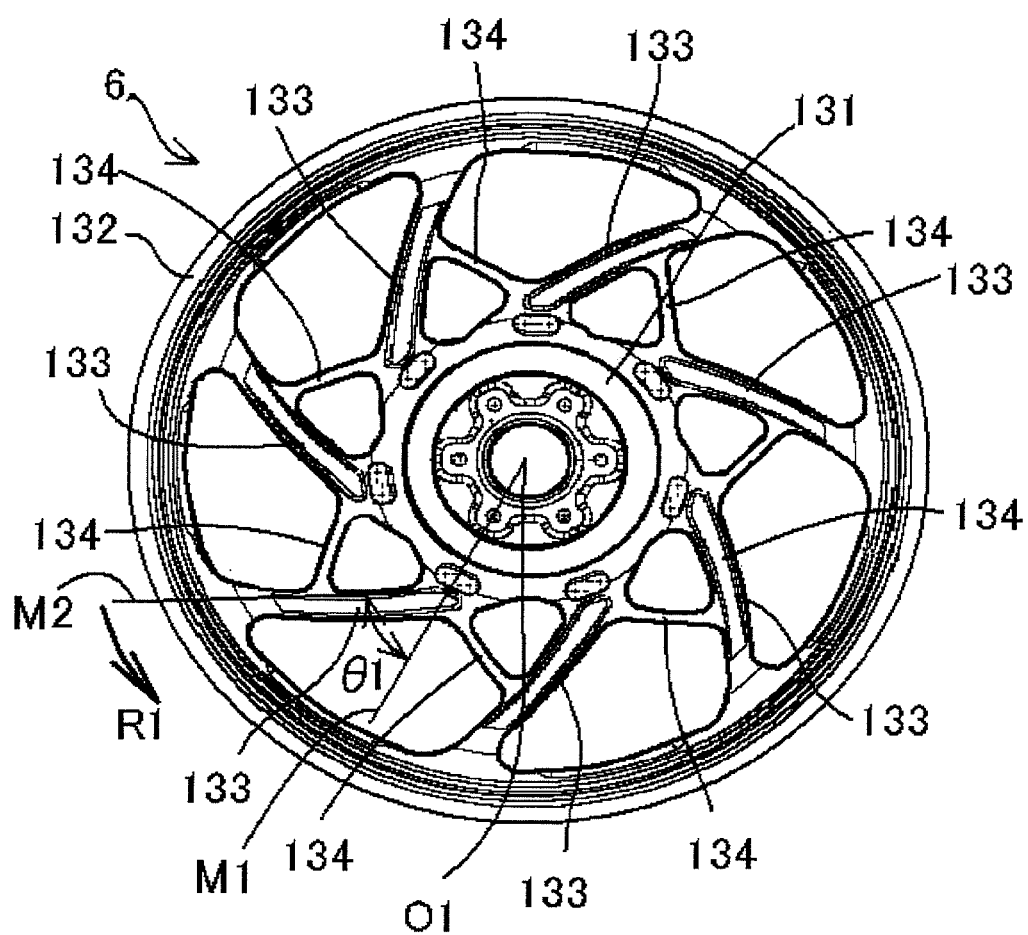
FIG. 14 is a left side view showing a modification example of the front wheel according to the present invention.
Figure 15:
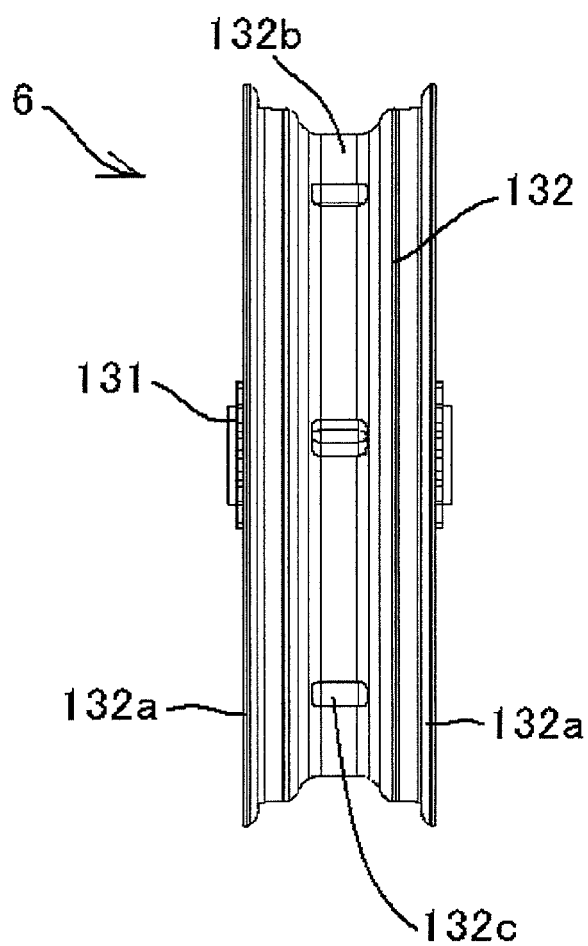
FIG. 15 is a front view showing the front wheel in FIG. 14.

(2) FIG. 14 is a left side view showing a modification example of the front wheel 6, FIG. 15 is a front view of the front wheel 6 in FIG. 14, and the front spokes include seven front main spokes 133 and seven front sub spokes 134 connected to the front main spokes 133.

The inner radial end of each of the curved front main spokes 133 is smoothly connected to the front sub spoke 134 coupled to the front main spoke 133 next to the front main spoke 133 across two front main spokes 133 in the wheel rotating direction R1 via the outer circumferential end of the front hub 131, and the load applied from the road surface in the longitudinal direction of the front main spokes 133 becomes the load of the front sub spoke 134 next to the front main spoke 133 across two front sub spokes 134. Other configurations are the same as those in FIG. 10, and the same components are given the same reference numerals. As shown in FIG. 14, in a case where seven front main spokes 133 are provided, the inclined angle θ1 of the main spokes 133 is preferably, about 45 degrees.

Figure 16:
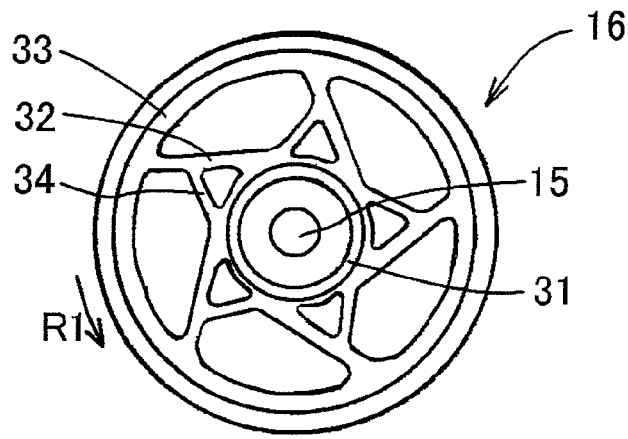
FIG. 16 is a left side view showing another modification example of the wheel according to the present invention.

(3) FIG. 16 shows another modification example of the rear wheel 16, and as shown in FIG. 2, the rear spokes include the five rear main spokes 33 and the five rear sub spokes 34 connected to the respective rear main spokes, but each of the rear main spokes 33 is linear. Other configurations are the same as those in FIG. 2, and the same components are given the same reference numerals. As a matter of course, the wheel configuration in FIG. 12 can be applied to the front wheel 6.

Figure 17:
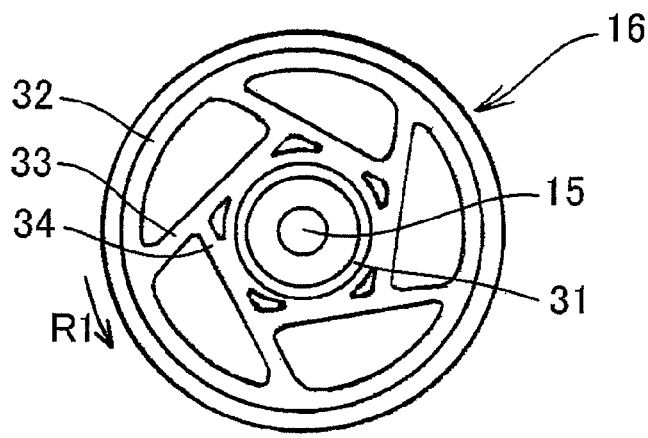
FIG. 17 is a left side view showing another modification example of the wheel according to the present invention.

(4) FIG. 17 also shows another modification example of the rear wheel 16, and as shown in FIG. 2, the rear spokes include the five rear main spokes 33 and the five rear sub spokes 34 connected to the respective rear main spokes 33, but each of the rear main spokes 33 is linearly formed, and the inner end of each of the rear main spokes 33 in the wheel radial direction is substantially linearly coupled to the rear sub spoke 34 coupled to the adjacent rear main spoke 33. Other configurations are the same as those in FIG. 2, and the same components are given the same reference numerals. As a matter of course, the wheel configuration in FIG. 13 can be applied to the front wheel 6. In this modification example, the rear main spokes 33 can be curved.

Figure 18:
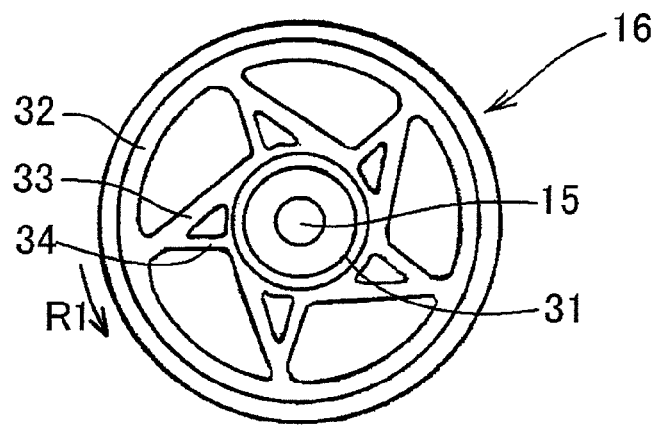
FIG. 18 is a left side view showing another modification example of the wheel according to the present invention.

(5) FIG. 18 also shows another modification example of the rear wheel 16, and as shown in FIG. 2, the rear spokes include the five rear main spokes 33 and the five rear sub spokes 34 connected to the respective rear main spokes, but each of the rear main spokes 33 is linearly formed. However, no rear sub spoke 34 is arranged on the inner extension in the longitudinal direction of the rear main spokes 33. In this modification example, the rear main spokes 33 may be curved.

(6) In the rear wheel configuration according to the present invention, which includes the rear main spokes 33 and the rear sub spokes 43, preferably, the rear main spokes 33 and the rear sub spokes 34 have a cross-sectional shape and a shape when viewed in the axle direction such that the rigidity of the rear main spokes 33 is larger than the rigidity of the rear sub spokes 34. Thereby, the load from the road surface can be received mainly by the rear main spokes 33. As a specific example, the rear main spokes 33 and the rear sub spokes 34 are configured such that at least a portion of the radial dimension of the rear main spokes 33 is larger than that of the rear sub spokes 34.

Figure 19:
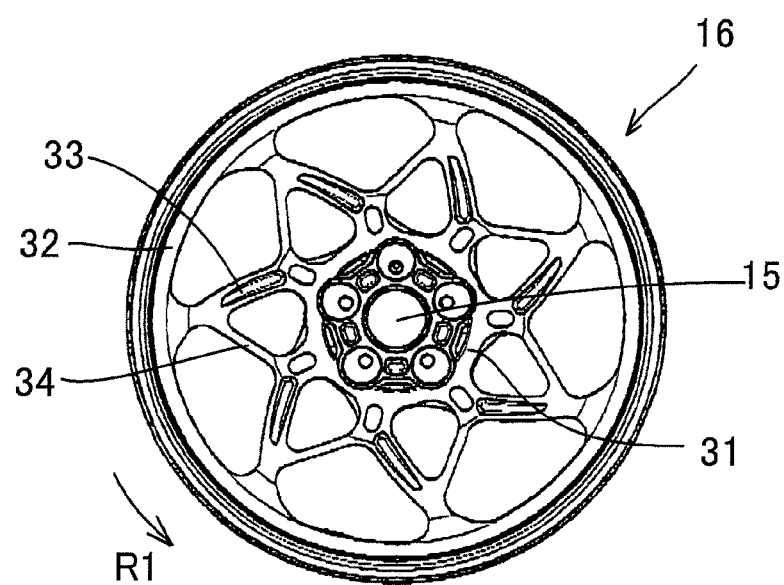
FIG. 19 is a left side view showing another modification example of the wheel according to the present invention.

(7) FIG. 19 shows another modification example of the rear wheel 16, and rear spokes therein are different from the rear spokes in FIG. 2 in the number of spokes, and the rear spokes therein include seven rear main spokes 33 and seven rear sub spokes 34 coupled to the respective rear main spokes 33, and each of the rear main spokes 33 is curved.

[Another Attachment Example to the Motorcycle]

Figure 20:
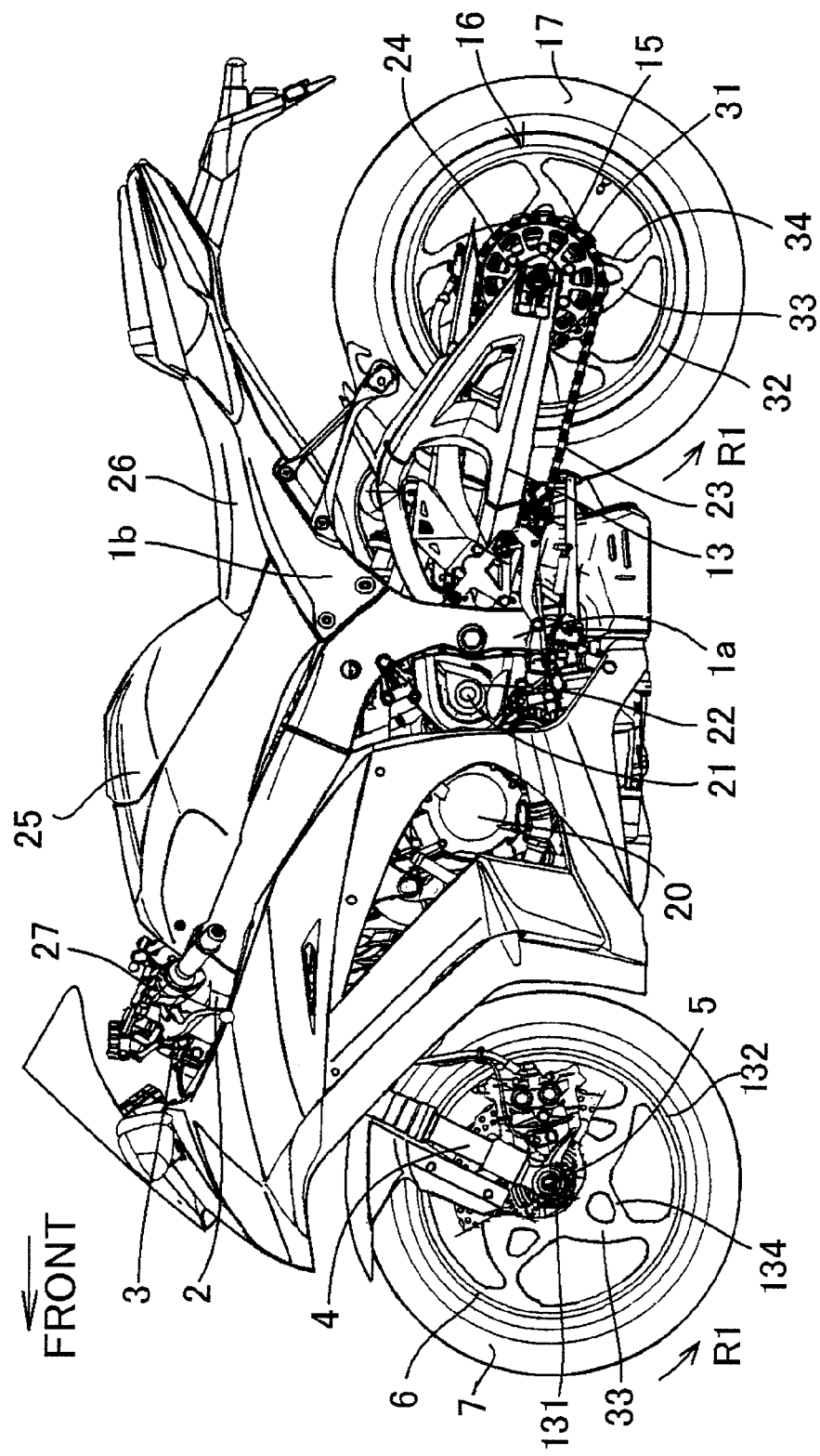
FIG. 20 is a left side view showing the motorcycle in a wheel attachment example that is different from that shown in FIG. 1.

FIG. 20 shows another attachment example to the motorcycle. The wheel as the front wheel 6 includes the front main spokes 133 and the front sub spokes 134 that are inclined in the same direction as each spoke of the rear wheel 16. The other configuration is the same as that of the embodiment.

Figure 21:
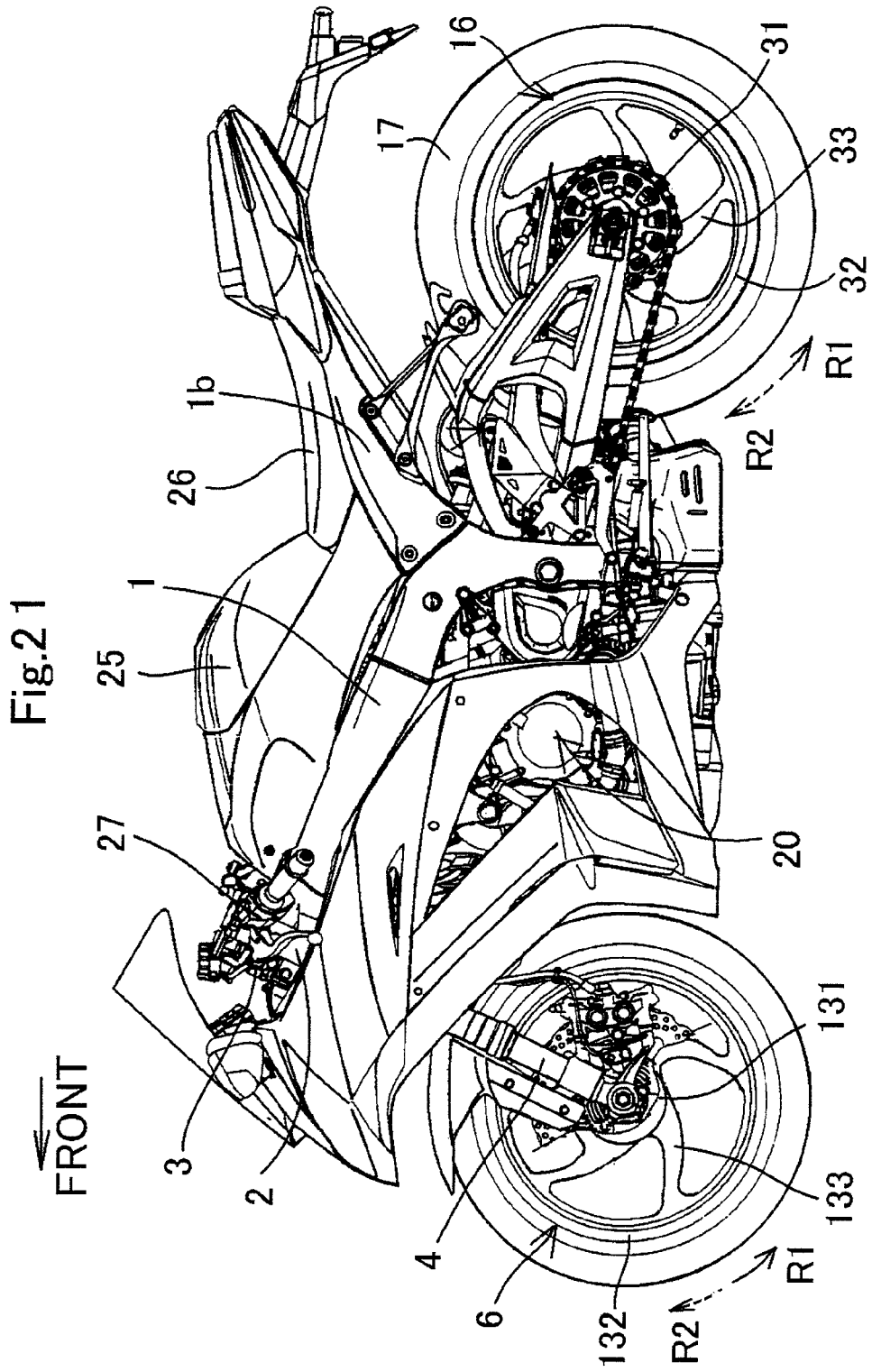
FIG. 21 is a left side view showing the motorcycle in a wheel attachment example that is different from that shown in FIG. 1.
Figure 22:
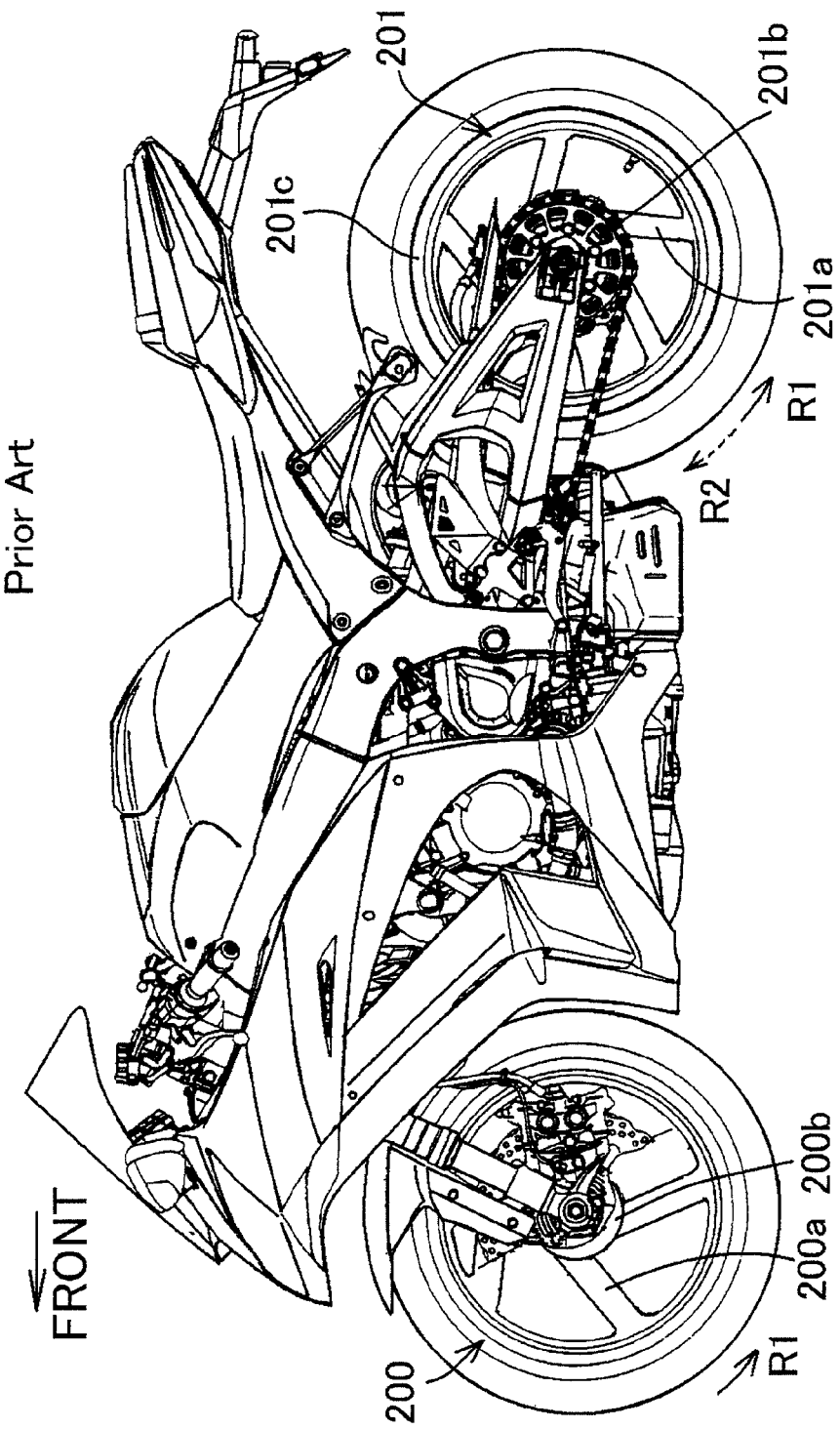
FIG. 22 is a left side view of a conventional motorcycle.
Figure 23:
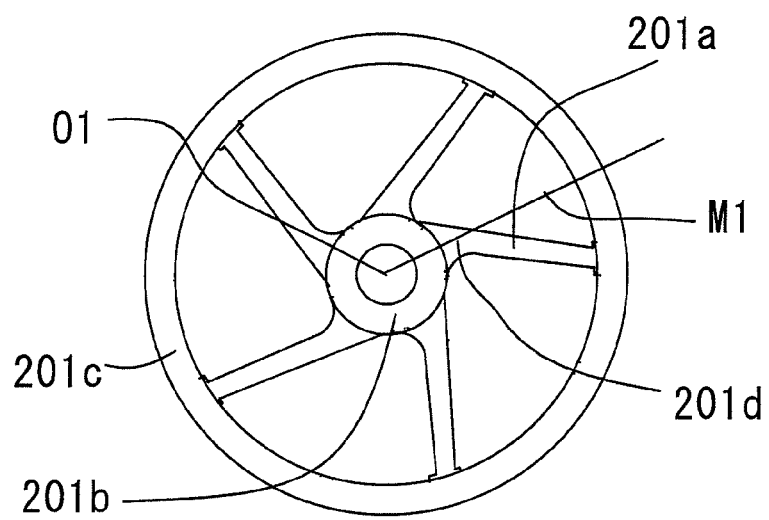
FIG. 23 is a left side view of the rear wheel in FIG. 22.

FIG. 21 is a left side view showing another example of the motorcycle from the second aspect of the present invention, and both the rear wheel 16 and the front wheel 6 have no sub spokes. That is, the motorcycle includes only the rear main spokes 33 and the front main spokes 133, which correspond to the rear main spokes 33 and the front main spokes 133 in the first embodiment, respectively. The rear spokes (main spokes) 33 of the rear wheel 16 are inclined outwardly in the wheel radial direction toward the rotating direction R1, and are curved so as to expand toward the inverse rotating direction R2. The front spokes (main spokes) 133 of the front wheel 6 are inclined outwardly in the wheel radial direction toward the inverse rotating direction R2, and are curved so as to expand toward the rotating direction R1.

OTHER EMBODIMENTS (1) Although five or seven main spokes and five or seven sub spokes are provided in the embodiment and the modification examples, the present invention is not limited to such numbers of spokes. For example, three or nine main spokes and three or nine sub spokes may be provided. The number of main spokes is preferably, an odd number, and by providing an odd number of main spokes, the main spokes are not spaced 180 degrees apart in the wheel radial direction. As a result, the load transmitted from the road surface to the main spokes can be efficiently distributed all over the wheel.

(2) Although the front and rear wheels and the combination of the main spokes and the sub spokes are provided in the first embodiment, the wheel configuration of the present invention can be applied to either one of the wheels.

(3) Although all of the main spokes are coupled to the respective sub spokes in the embodiment, a given main spoke may be coupled to the sub spoke.

(4) It is preferred that the position where the sub spoke is coupled to the main spoke (center point C4 in FIG. 2) is the center of the main spoke in the radial direction or a position outside the center in the radial direction.

(5) The present invention can be applied to vehicles having an engine (e.g., an internal combustion engine) as well as vehicles such as electric motorcycles.

(6) The wheel configuration according to the present invention can be applied to vehicles other than motorcycles, and application to saddle-type vehicles is effective.

(7) The present invention can be modified and changed without deviating from the spirit and scope of the present invention as defined in the claims.

What is claimed is:

1. A wheel for a motorcycle, comprising:
a hub supported by an axle;
a rim holding a tire; and
a plurality of spokes connecting the hub to the rim,
the hub, the rim and the spokes being integrally provided, wherein:
the plurality of spokes includes a main spoke extending from the hub to the rim and a sub spoke extending from the hub to an intermediate portion of the main spoke and being connected with the intermediate portion of the main spoke integrally, and the sub spoke terminating at the intermediate portion of the main spoke such that no spoke extends between the intermediate portion of the main spoke and the rim,
the main spoke extends outwardly from the hub in a wheel radial direction and is inclined toward a first wheel circumferential direction with respect to a straight line connecting a first coupling portion between the main spoke and the hub to a wheel rotational center, and
the sub spoke extends outwardly from the hub in the wheel radial direction and is inclined toward a second wheel circumferential direction with respect to a straight line connecting a second coupling portion between the sub spoke and the hub to the wheel rotational center.

2. The wheel for the motorcycle according to claim 1, wherein:
the main spoke is one of a plurality of main spokes,
the sub spoke is one of a plurality of sub spokes, and
a first one of the plurality of main spokes and one of the plurality of sub spokes which is coupled to a second one of the plurality of main spokes are arranged such that a load applied from a road surface to the first one of the plurality of main spokes is transmitted to the one of the plurality of sub spokes.

3. The wheel for the motorcycle according to claim 2, wherein:
the one of the plurality of sub spokes is arranged, along a longitudinal direction of the first one of the plurality of main spokes, substantially on an extension from the rim toward the hub.

4. The wheel for the motorcycle according to claim 3, wherein:
the second coupling portion exists between the one of the plurality of sub spokes and the hub on an extension of a line segment from the rim to the hub along the longitudinal direction of the first one of the plurality of main spokes, and the one of the plurality of sub spokes extends along the extension outwardly in the wheel radial direction.

5. The wheel for the motorcycle according to claim 4, wherein:
an outer circumference of the hub connects the first coupling portion and the second coupling portion.

6. The wheel for the motorcycle according to claim 2, wherein:
a third one of the plurality of main spokes is arranged between the first one of the plurality of main spokes and the second one of the plurality of main spokes in the first wheel circumferential direction.

7. The wheel for the motorcycle according to claim 6, wherein:
the second coupling portion is set so as to overlap with a third coupling portion between the third one of the plurality of main spokes and the hub in the first wheel circumferential direction.

8. The wheel for the motorcycle according to claim 2, wherein:
a fourth coupling portion between the second one of the plurality of main spokes and the hub is separated from the first coupling portion by 90 degrees or more in the first wheel circumferential direction.

9. The wheel for the motorcycle according to claim 3, wherein:

the hub includes a cylindrical hub body and a protruding portion protruding from the hub body outwardly in the wheel radial direction, the protruding portion extending in the first wheel circumferential direction, and the protruding portion extends from the first coupling portion to the second coupling portion in the first wheel circumferential direction.

10. The wheel for the motorcycle according to claim 3, wherein:

the first one of the plurality of main spokes is curved so as to expand toward the second wheel circumferential direction, and the first one of the plurality of main spokes is curved so as to be smoothly connected to an arcuate outer circumference of the hub, the arcuate outer circumference of the hub extending from the second coupling portion to the first coupling portion.

11. The wheel for the motorcycle according to claim 1, wherein:

the main spoke is tapered such that a size in the first wheel circumferential direction becomes smaller toward an outer side of the wheel in the wheel radial direction.

12. The wheel for the motorcycle according to claim 1, wherein:

a recess recessed inwardly in the wheel radial direction is formed at a central portion of the rim in an axial direction over an entire circumference of the rim, the recess having a substantially rectangular cross section.

13. The wheel for the motorcycle according to claim 1, wherein:

the main spoke and the sub spoke diverge at the intermediate portion of the main spoke inwardly from the rim in the wheel radial direction.

14. The wheel for the motorcycle according to claim 1, wherein:

the main spoke is curved so as to expand with respect to a straight line connecting respective center points of the first coupling portion on an inner side of the wheel and an outer side of the wheel in a radial direction of the main spoke, and the sub spoke is substantially linearly formed.

15. The wheel for the motorcycle according to claim 1, wherein:

the main spoke is curved so as to expand with respect to a straight line connecting respective center points of the first coupling portion on an inner side of the wheel and an outer side of the wheel in a radial direction of the main spoke and a curved portion of the main spoke has a tapered portion disposed such that a width of the main spoke in the first wheel circumferential direction becomes smaller toward the outer side of the wheel, and the sub spoke is substantially linearly formed and a width of the sub spoke in the first wheel circumferential direction is substantially uniform all over a whole length of the sub spoke in a radial direction of the sub spoke.

16. The wheel for the motorcycle according to claim 1, wherein:

the main spoke has a portion in which a width of the main spoke in the first wheel circumferential direction is larger than a width of the sub spoke in the first wheel circumferential direction.

17. Wheels for a motorcycle, comprising:

a rear wheel coupled to a driving source; and a front wheel driven by driving a vehicle, wherein:

the rear wheel integrally includes a rear hub supported by a rear axle, a rear rim holding a rear tire, and a rear spoke connecting the rear hub to the rear rim, the rear spoke extends outwardly from the hub in a wheel radial direction, is inclined toward a first rotating direction of the rear wheel and is curved toward a second rotating direction of the rear wheel that is opposite to the first rotating direction of the rear wheel, and the rear spoke includes:

a rear main spoke extending outwardly in the wheel radial direction from the rear hub to the rear rim, the rear main spoke being inclined toward the first rotating direction of the rear wheel and being curved toward the second rotating direction of the rear wheel, and a rear sub spoke extending outwardly in the wheel radial direction from the rear hub to an intermediate portion of the rear main spoke and being connected with the intermediate portion of the rear main spoke integrally, the rear sub spoke terminating at the intermediate portion of the rear main spoke such that no spoke extends between the intermediate portion of the rear main spoke and the rear rim, and the rear sub spoke being inclined toward the second rotating direction of the rear wheel.

18. The wheels for the motorcycle according to claim 17, wherein:

the front wheel integrally includes a front hub supported by a front axle, a front rim holding a front tire, and a front spoke connecting the front hub to the front rim, and the front spoke extends outwardly from the front hub in the wheel radial direction, is inclined toward the second rotating direction of the front wheel and is curved toward the first rotating direction of the front wheel.

19. The wheels for the motorcycle according to claim 17, wherein:

the front wheel integrally includes a front hub supported by a front axle, a front rim holding a front tire, and a front spoke connecting the front hub to the front rim, and the front spoke extends outwardly from the front hub in the wheel radial direction, is inclined toward the first rotating direction of the front wheel and is curved toward the second rotating direction of the front wheel.

20. Wheels for a motorcycle comprising:

a rear wheel coupled to a driving source; and a front wheel driven by driving a vehicle, wherein:

the front wheel integrally includes a front hub supported by a front axle, a front rim holding a front tire, and a front spoke connecting the front hub to the front rim, the front spoke extends outwardly from the hub in a wheel radial direction, is inclined toward a second rotating direction of the front wheel and is curved toward a first rotating direction of the front wheel that is opposite to the second rotating direction of the front wheel, and the front spoke includes:

a front main spoke extending outwardly in the wheel radial direction from the front hub to the front rim, the front main spoke being inclined toward the second rotating direction of the front wheel and being curved toward the first rotating direction of the front wheel, and a front sub spoke extending outwardly in the wheel radial direction from the front hub to an intermediate portion of the front main spoke and being connected with the intermediate portion of the front main spoke integrally, the front sub spoke terminating at the intermediate portion of the front main spoke such that no spoke extends between the intermediate portion of the front main spoke and the front rim, and the front sub spoke being inclined toward the first rotating direction of the front wheel.

* * * * *